(12) United States Patent
Benedetti et al.

(10) Patent No.: US 10,894,516 B2
(45) Date of Patent: Jan. 19, 2021

(54) U-BASE FASTENER WITH FOLDED BARB AND MULTIPLE SPRING ARMS

(71) Applicant: Newfrey LLC, New Britain, CT (US)

(72) Inventors: Steven M. Benedetti, Macomb, MI (US); Wayne Robert Boylan, Macomb Township, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 16/007,728

(22) Filed: Jun. 13, 2018

(65) Prior Publication Data

US 2019/0111857 A1    Apr. 18, 2019

Related U.S. Application Data

(63) Continuation-in-part of application No. 15/909,057, filed on Mar. 1, 2018, now Pat. No. 10,590,968, and
(Continued)

(51) Int. Cl.
*B60R 13/02* (2006.01)
*F16B 2/24* (2006.01)
(Continued)

(52) U.S. Cl.
CPC .......... *B60R 13/0206* (2013.01); *F16B 2/243* (2013.01); *F16B 5/0657* (2013.01); *F16B 21/075* (2013.01); *F16B 5/065* (2013.01)

(58) Field of Classification Search
CPC ..... B60R 13/0206; F16B 2/243; F16B 5/0657
See application file for complete search history.

(56) References Cited

U.S. PATENT DOCUMENTS 2,100,551 A   11/1937 Reiter
2,607,971 A    8/1952 Bedford
(Continued)

FOREIGN PATENT DOCUMENTS

BE   632590 A   10/1963
CA   496700 A   10/1953
(Continued)

OTHER PUBLICATIONS

Extended European Search Report dated Oct. 28, 2019 in European Patent Application No. 19177827.3.

*Primary Examiner* — Robert Sandy
*Assistant Examiner* — Rowland Do
(74) *Attorney, Agent, or Firm* — Harness, Dickey & Pierce, P.L.C.

(57) ABSTRACT

A resilient U-base fastener includes a U-shaped body defining a central body cavity between a first side and a second side. The first side is connected to the second side at an insertion end. The U-base fastener also includes a first spring arm connected to the first side of the body that bends outwardly and away from the central body cavity at a first bend and a second spring arm connected to the first side of the body adjacent the first spring arm. The second spring arm bends outwardly and away from the central body cavity at a second bend. The first spring arm and the second spring arm are laterally spaced apart from one another and are separated by a gap in the first side of the body. The gap extends toward the insertion end past the first bend and past the second bend.

21 Claims, 15 Drawing Sheets

Related U.S. Application Data a continuation-in-part of application No. 15/787,288, filed on Oct. 18, 2017, now Pat. No. 10,704,577.

(51) Int. Cl.
  *F16B 5/06* (2006.01)
  *F16B 21/07* (2006.01)

(56) References Cited

U.S. PATENT DOCUMENTS

| | | | |
|---|---|---|---|
| 2,825,948 A | 3/1958 | Parkin | |
| 3,525,129 A | 8/1970 | Holton | |
| 3,673,643 A | 7/1972 | Kindell | |
| 4,402,118 A | 9/1983 | Benedetti | |
| 4,683,622 A | 8/1987 | Oehlke | |
| 4,865,505 A | 9/1989 | Okada | |
| 5,314,280 A | 5/1994 | Gagliardi et al. | |
| 5,373,611 A | 12/1994 | Murata | |
| 5,422,789 A | 6/1995 | Fisher et al. | |
| 5,533,237 A | 7/1996 | Higgins | |
| 5,542,158 A | 8/1996 | Gronau et al. | |
| 5,774,949 A | 7/1998 | Cornell et al. | |
| 6,021,986 A * | 2/2000 | Murdock | B60J 3/0217 248/224.8 |
| 6,141,837 A | 11/2000 | Wisniewski | |
| 6,279,207 B1 | 8/2001 | Vassiliou | |
| 6,353,981 B1 | 3/2002 | Smith | |
| 6,381,811 B2 | 5/2002 | Smith et al. | |
| 6,438,804 B1 | 8/2002 | Romero Magarino | |
| 6,454,507 B1 | 9/2002 | Romero Magarino | |
| 6,527,471 B2 | 3/2003 | Smith et al. | |
| 6,629,809 B2 * | 10/2003 | Vassiliou | F16B 37/02 411/173 |
| 6,796,006 B2 | 9/2004 | Hansen | |
| 6,976,292 B2 * | 12/2005 | MacPherson | B60N 3/026 24/292 |
| 7,051,408 B2 | 5/2006 | De Azevedo et al. | |
| 7,178,850 B2 | 2/2007 | Smith et al. | |
| 7,186,051 B2 | 3/2007 | Benedetti et al. | |
| 7,226,260 B2 * | 6/2007 | Jackson, Jr. | F16B 21/076 411/112 |
| 7,356,886 B2 | 4/2008 | Okada | |
| 7,374,200 B2 | 5/2008 | Ikeda et al. | |
| 7,428,770 B2 | 9/2008 | Dickenson et al. | |
| 7,552,516 B2 | 6/2009 | Okada et al. | |
| 7,849,567 B2 | 12/2010 | Dickenson et al. | |
| 8,051,539 B2 | 11/2011 | Benedetti et al. | |
| 8,128,145 B2 | 3/2012 | Smith et al. | |
| 8,316,513 B2 | 11/2012 | DeJong et al. | |
| 8,370,999 B2 | 2/2013 | Camus | |
| 8,474,107 B2 | 7/2013 | Baumgartner et al. | |
| 8,950,042 B2 * | 2/2015 | Smith | B60R 13/0206 24/293 |
| 9,562,554 B2 * | 2/2017 | Vidal | F16B 5/0258 |
| 2005/0236861 A1 * | 10/2005 | Slobodecki | B60R 13/0206 296/39.1 |
| 2006/0168773 A1 | 8/2006 | Smith et al. | |
| 2008/0086850 A1 | 4/2008 | Smith et al. | |
| 2009/0205174 A1 | 8/2009 | Slobodecki et al. | |
| 2009/0293237 A1 | 12/2009 | Benedetti et al. | |
| 2011/0116890 A1 | 5/2011 | Okada et al. | |
| 2013/0340216 A1 | 12/2013 | Smith et al. | |
| 2015/0076304 A1 | 3/2015 | Hattori | |
| 2015/0267734 A1 * | 9/2015 | Boyer | F16B 37/02 411/520 |
| 2015/0321622 A1 | 11/2015 | Dickinson et al. | |
| 2016/0068118 A1 | 3/2016 | Benedetti | |
| 2016/0214520 A1 | 7/2016 | Kajio | |
| 2016/0356298 A1 | 12/2016 | Pquet | |
| 2016/0375840 A1 | 12/2016 | Dickinson et al. | |
| 2017/0113629 A1 | 4/2017 | Dickinson et al. | |
| 2017/0113632 A1 | 4/2017 | Dickinson et al. | |

FOREIGN PATENT DOCUMENTS

| | | |
|---|---|---|
| EP | 0899466 A1 | 3/1999 |
| EP | 1482184 A2 | 12/2004 |
| EP | 1510702 A1 | 3/2005 |
| EP | 2233386 A1 | 9/2010 |
| EP | 2139727 B1 | 12/2010 |
| FR | 2976986 A1 | 12/2012 |
| GB | 1171363 A | 11/1969 |
| WO | WO 2012/104250 A1 | 8/2012 |

\* cited by examiner

U-BASE FASTENER WITH FOLDED BARB AND MULTIPLE SPRING ARMS

CROSS-REFERENCE TO RELATED APPLICATIONS

This application is a continuation-in-part of U.S. patent application Ser. No. 15/787,288 filed on Oct. 18, 2017 and also a continuation-in-part of U.S. patent application Ser. No. 15/909,057 filed on Mar. 1, 2018. The entire disclosures of the above applications are incorporated herein by reference.

FIELD

The present disclosure relates to fasteners and more particularly to U-based resilient fasteners.

BACKGROUND

This section provides background information related to the present disclosure which is not necessarily prior art.

Various types of fasteners are often used to connect mating components in products, vehicles, and other environments. One type of fastener is a U-base fastener. U-base fasteners (or U-base clips) are of particular use to easily attach two mating components to one another. One component typically has a feature such as a rib that is received into the U-base fastener and the rib is secured within the U-base fastener. The component can then be secured to a second component by inserting the U-base fastener into an opening in the second component. A barb or other feature of the U-base clip typically retains the rib inside the U-base fastener and other elements of the U-base clip secure the U-base clip in the opening in the second component.

One application for U-base clips is in the context of securing components at a desired location in a vehicle. Such components in vehicles can include interior trim components, exterior trim components, fascia components and various other covers, ornamentation and the like. In these and other applications, the insertion force required to insert the rib into the U-base fastener and the insertion force required to insert the U-base fastener into the opening are important characteristics. The retention force, the force required to remove the U-base fastener from the opening, is also an important characteristic. Other characteristics of U-base fasteners are also important, including the size of the fastener, the ability to use the fastener in variety of applications, the ease and efficiency of manufacturing the fastener, the reliability and durability of the fastener, the cost of the fastener and others.

SUMMARY

This section provides a general summary of the disclosure, and is not a comprehensive disclosure of its full scope or all of its features.

One example resilient U-base fastener in accordance with the present disclosure can include a U-shaped body defining a central cavity between a first side and a second side. The first side is connected to the second side at an insertion end and the first side has a first lateral side edge and a second lateral side edge. The second side having a third lateral side edge and a fourth lateral side edge. The U-base fastener also includes a first barb extension extending outwardly from the first lateral side edge that is bent to support a first barb in the central cavity. The first barb extends inwardly and toward the insertion end and at least a portion of the first barb is positioned between the first lateral side edge and the second lateral side edge of the first side. The U-base fastener also includes a second barb extension extending outwardly from the second lateral side edge that is bent to support a second barb in the central cavity. The second barb extends inwardly and toward the insertion end and at least a portion of the second barb is positioned between the first lateral side edge and the second lateral side edge of the first side. The U-base fastener also includes a first spring arm connected to the body adjacent to the insertion end that extends outwardly from the second side and away from the central cavity.

Another example U-base fastener in accordance with the present disclosure includes a U-shaped body defining a central cavity between a first side and a second side. The first side is connected to the second side at an insertion end. The fastener also includes a first pair of barb extensions extending outwardly from opposite lateral side edges of the first side. The first pair of barb extensions are bent to support a first pair of barbs in the central cavity. The fastener further includes a second pair of barb extensions extending outwardly from opposite lateral side edges of the second side. The second pair of barb extensions are bent to support a second pair of barbs in the central cavity. The fastener also includes a first spring arm connected to the body adjacent to the insertion end and extending outwardly from the first side and away from the central cavity and a second spring arm connected to the body adjacent to the insertion end and extending outwardly from the second side and away from the central cavity.

In one aspect of the present disclosure, the first spring arm and the second spring arm can be laterally spaced apart from one another and are separated by a gap in the first side of the body. The gap can extend toward the insertion end past a first bend of the first spring arm at which the first spring arm bends outward from the first side and past a second bend of the second spring arm at which the second sprig arm bends outward from the first side.

In another aspect, an inner lateral edge of the first spring arm and an inner lateral edge of the second spring arm define a gap to separate the first spring arm from the second spring arm, and the inner lateral edge of the first spring arm has an inner vertical height that is longer than an outer vertical height of the outer lateral edge of the first spring arm.

In another aspect, the gap can separate the first spring arm from the second spring arm on the first side and can separate the third spring arm from the fourth spring arm on the second side. The fastener can include a bridging portion that extends laterally across the gap at the insertion end of the body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
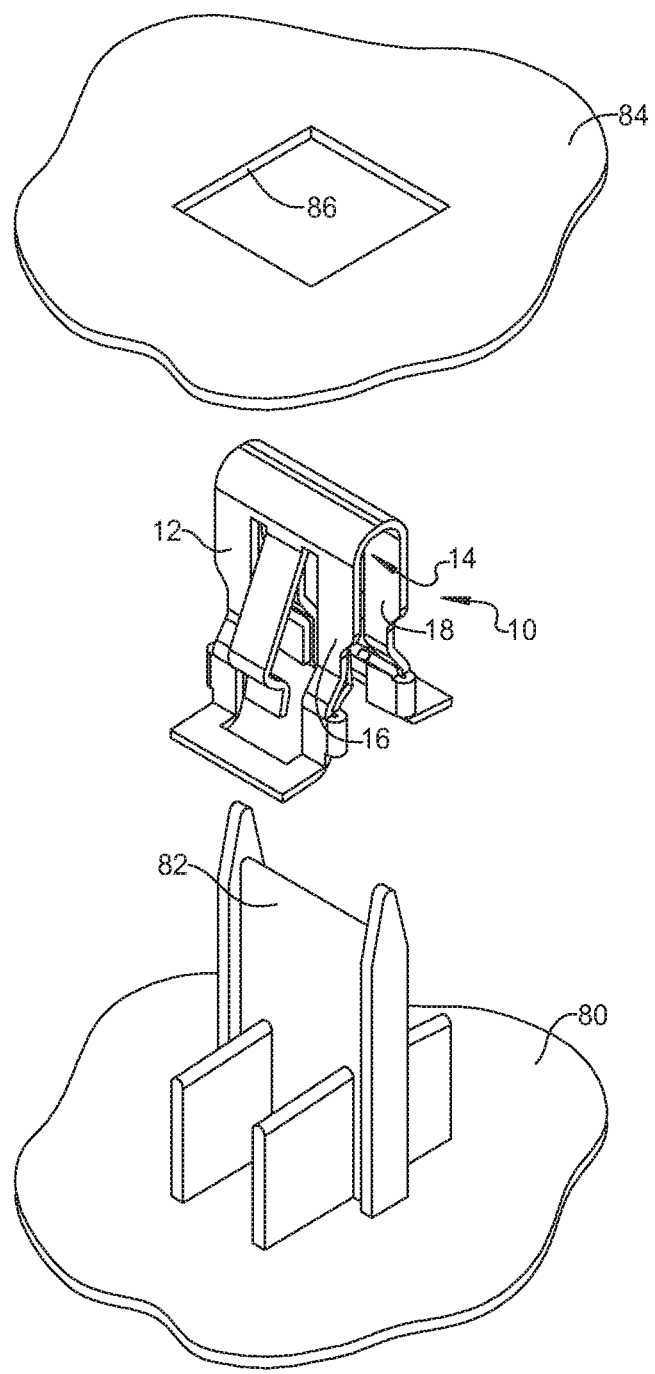
FIG. 1 is a partial exploded view of one example fastener with a first component and a second component secured thereby in accordance with the present disclosure.

FIGS. 1-6 show one example embodiment of a U-base fastener in accordance with the present disclosure. A fastener 10 includes a body 12 with a first side 16 and a second side 18. FIG. 1 shows the example fastener 10 connected to a first component 80 with a rib 82. As will be explained, one or more barbs secure the fastener 10 to the rib 82. After the fastener 10 is secured to the rib 82, the first component 80 can be connected to a second component 84 by inserting the fastener 10 into an opening 86 in the second component 84. In this manner, the first component 80 is secured to the second component 84.

Referring now to FIGS. 2-6, the body 12 of the fastener 10, in this example, is U-shaped and includes an insertion end 20 with a rounded profile connecting the first side 16 to the second side 18. The body 12 extends away from an insertion end 20 along the first side 16 and the second side 18 toward a trailing end 22. The first side 16 has two lateral side edges 24 that extend on the edges of the first side 16 from the insertion end 20 to the trailing end 22. Similarly, the second side 18 also has two lateral side edges 24 that extend along the edges of the second side 18 from the insertion end 20 to the trailing end 22. At the trailing end 22, the first side 16 and the second side 18 each can turn outward and can form a first flange 26 at the first side 16 and a second flange 28 at the second side 18. In this example, the first flange 26 spans the width of the body 12 on the first side 16 and the second flange 28 spans the width of the body 12 on the second side 18.

As can be seen, this structure of the body 12 forms a central cavity 14 that is located between the first side 16 and the second side 18. As can be appreciated and as shown in FIG. 1, the rib 82 fits into the central cavity 14. The insertion end 20 can then be inserted into the opening 86 of the second component 84. The opening 86 in the second component 84 has a width that is smaller than the distance between an outer edge 30 of the first flange 26 and an outer edge 32 of the second flange 28. With this relative sizing, the fastener 10 is not permitted to pass through the opening 86. The first flange 26 and the second flange 28 of the fastener 10 seat on an outer surface of the second component 84.

Figure 2:
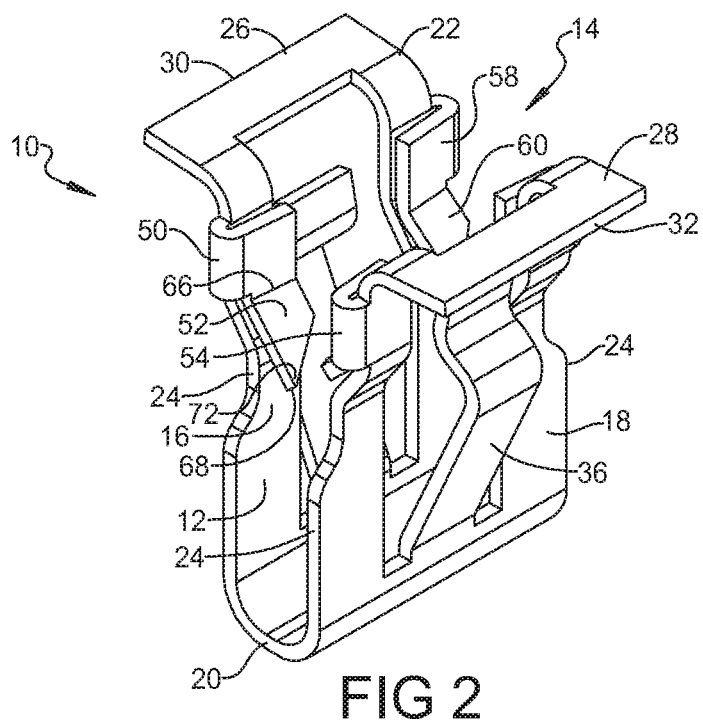
FIG. 2 is a perspective view of the fastener shown in FIG. 1.
Figure 3:
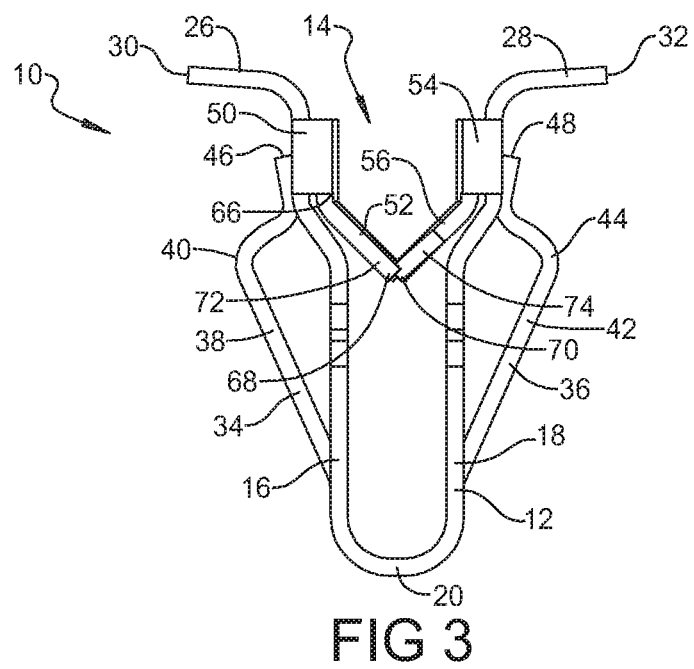
FIG. 3 is a side view of the fastener shown in FIG. 1.

The fastener 10 is retained in the opening 86 of the second component 84 by one of more spring arms such as, a first spring arm 34 and a second spring arm 36 in this example. In other examples, the fastener 10 can include a single spring arm. In the example shown, the fastener 10 includes two spring arms located on opposite sides of the fastener 10. As can be seen in FIGS. 2 and 3, the first spring arm 34 and the second spring arm 36 are located between the lateral side edges 24 of the body 12. The first spring arm 34 is connected to the body 12 at or near the insertion end 20 and extends outward from the first side 16 and away from the insertion end 20. The first spring arm 34 extends outward and away along elongated portion 38 until the first spring arm 34 bends back toward the first side 16 at a first shoulder 40. The first spring arm 34 then bends again and follows a direction generally more parallel to the first side 16 before stopping at a terminating end 46 located under the first flange 26 at a trailing end 22 of the fastener 10.

The second spring arm 36 can be disposed on the opposite side of the fastener 10 and is substantially symmetrical to the first spring arm 34 as shown in FIG. 3. The second spring arm 36 can be connected to the second side 18 at or near the insertion end 20 and extends away from the insertion end 20 and outwardly from the second side 18. The second spring arm 36 includes an elongated portion 42 that can be oriented at an acute angle to the second side 18 before bending back toward the second side 18 at a second shoulder 44.

The first spring arm 34 and the second spring arm 36 are able to flex such that the first spring arm 34 and the second spring arm 36 can move inwardly relative to the first side 16 and the second side 18, respectively. When the fastener 10 is inserted into the opening 86 in the second component 84, the first spring arm 34 and the second spring arm 36 flex when they contact the edges of the opening 86 and move inward toward the central cavity 14. After passing through the opening 86, the first spring arm 34 and the second spring arm 36 flex back outward toward their original positions. The first shoulder 40 and the second shoulder 44 move outward and retain the fastener 10 to the second component 84. When installed, the thickness of the material of the second component is captured between the first shoulder 40 and the first flange 26 of the first side 16 and between the second shoulder 44 and the second flange 28 of the second side 18.

As further shown in FIGS. 2 and 3, the fastener 10 also includes at least one barb extension and at least one barb. In one example, the fastener 10 includes a first barb extension 50, a second barb extension 58, a third barb extension 54, a fourth barb extension 62, a first barb 52, a second barb 60, a third barb 56 and a fourth barb 64. In this example, each of the four barb extensions and each of the four barbs is similar to one another. The first barb extension 50 and the first barb 52 are hereinafter described but it should be appreciated that the other barb extensions and the other barbs can have a similar structure and can be symmetrically disposed or mirrored on an opposite side of the fastener 10.

Figure 5:
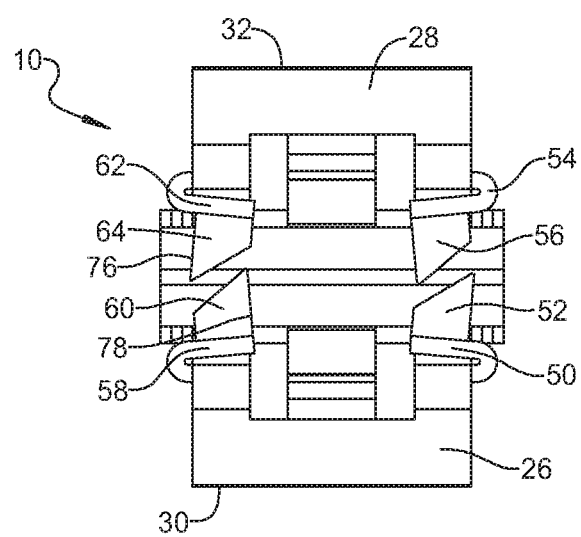
FIG. 5 is a top view of the fastener shown in FIG. 1.
Figure 6:
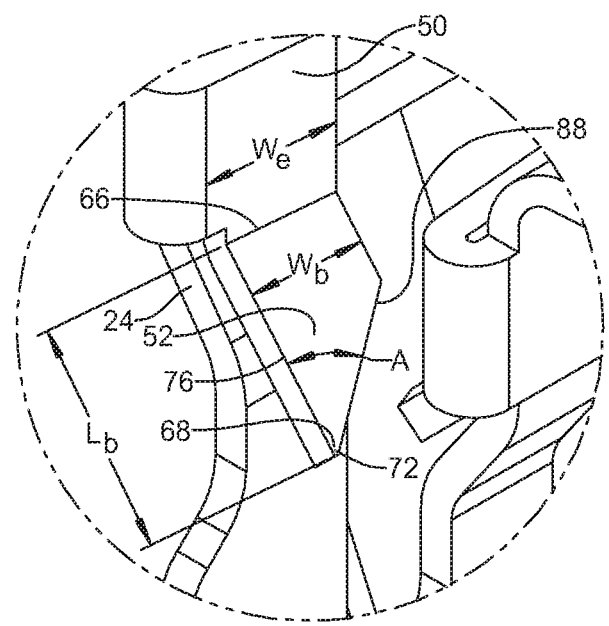
FIG. 6 is a magnified view of the barbs of the example fastener of FIG. 1.

As shown in FIGS. 2 and 6, the first barb 52 is connected to the body 12 of the fastener 10 by the first barb extension 50. The first barb extension 50 extends laterally away from the lateral side edge 24 of the first side 16. A portion of the first barb extension 50 can be positioned laterally outside the lateral side edge 24. The first barb extension 50 then bends back toward the central cavity 14 of the body 12 such that a portion of the first barb extension 50 overlaps the inner surface of the adjacent first side 16. As such, the first barb extension 50 is folded so that it is disposed between the first side 16 and the second side 18 in the central cavity 14. As further shown in FIG. 2, the bent portion of the first barb extension 50 has a rounded or curved shaped so that the bent portion of the first barb extension 50 has a U-shape when viewed from the trailing end 22 of the body 12 as shown in FIG. 5. The bent portion of the first barb extension 50 can have other shapes or profiles as well. The bent portion of the first barb extension 50, in other examples, can have a V-shape or a rectangular shape or can be crimped such that it has a substantially flat profile.

Figure 4:
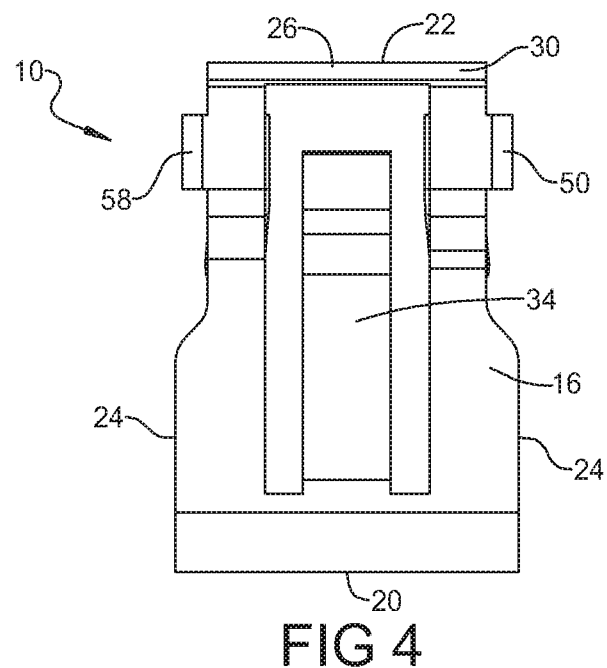
FIG. 4 is a front view of the fastener shown in FIG. 1.

As shown on FIG. 4, the lateral side edges 24 of the fastener 10 in this example are not linear when viewed from the front. The lateral side edges have an offset portion toward the trailing end 22. As can be seen, the lateral side edges 24 extend upward from the insertion end 20 along a first portion and then move inwardly toward the first spring arm 34 that is located at or near the center of the body 12. The opposite lateral side edge 24 follows the same profile such that the width of the body 12 is larger at the insertion end 20 than at the trailing end 22.

This profile of the body 12 advantageously results in a structure in which the barb extensions (50 and 58, in this example) located on opposite lateral sides of the fastener 10 do not project outward beyond the overall width of the body 12 at the insertion end 20. The maximum overall lateral distance between the first barb extension 50 and the second barb extension 58 is less than the maximum overall lateral width of the body 12 at the insertion end 20. In other examples, the overall lateral distance between opposing barb extensions can be equal to the overall lateral width of the body 12 at the insertion end 20. As can be appreciated, with this profile, the barb extensions do not contact or interfere with the insertion of the fastener 10 into the opening 86 since the outermost portions of the barb extensions are located laterally inward of the overall width of the body 12 at the insertion end 20.

The first barb extension 50, in this example, is joined to the first barb 52 at a bend 66 located toward the portion of the first barb extension 50 facing the insertion end 20 of the fastener 10. The first barb 52 is angled inward and away from the body 12 such that a distal end 68 of the first barb 52 extends into the central cavity 14. The second barb extension 58 and the second barb 60 can be similarly configured as shown in FIG. 2 such that the first barb 52 and the second barb 60 each extend outward from the first side 16 into the central cavity 14 are pointed toward the insertion end 20.

As previously discussed, the fastener 10 can also include the third barb extension 54, the third barb 56, the fourth barb extension 62 and the fourth barb 64 similarly configured and oppositely arranged on the second side 18 of the body 12. As can be appreciated, the first barb 52 and the third barb 56 are located opposite one another and the second barb 60 and the fourth barb 64 are located opposite one another. The distal ends of the opposing barbs can terminate at approximately the same vertical plane disposed along the center of central cavity 14 between and substantially parallel to the first side 16 and the second side 18.

In use, the rib 82 can be inserted into the central cavity 14 between the first side 16 and the second side 18. The rib 82 contacts and pushes past the barbs causing the barbs to engage and retain the rib 82. If the rib 82 is attempted to be removed from the central cavity 14, such movement of the inserted feature is resisted by the barbs. As can be appreciated, the distal ends of the barbs engage the surface of the rib 82 and prevent the rib 82 from being undesirably removed.

One example profile of the distal end 68 of the first barb 52 is shown in FIG. 6. In this example, the distal end 68 of the first barb 52 comes to a point 72. As also shown in FIGS. 5 and 6, the distal edge of the distal end 68 is angled and comes to the point 72 at a lateral outer edge 76 of the first barb 52. The third barb 56, in this example, is also pointed but a point 74 is located on a lateral inner edge 78 of the third barb 56. In this manner the respective points of the first barb 52 and the third barb 56 are positioned on opposite side edges of the barbs so that the points may overlap a vertical plane located at the center of central cavity 14 without contacting or interfering with each other.

Figure 7:
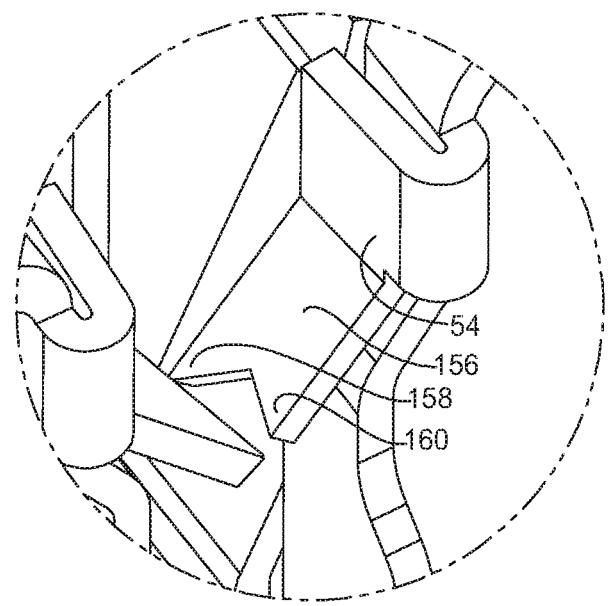
FIG. 7 is a magnified view of an alternative barb that can be used in accordance with the present disclosure.

In another example barb configuration, the barb can include two points. As shown in FIG. 7, example barb 156 includes two points. A first point 158 and a second point 160 are located at the side edges of the barb 156 and the distal edges of the barb 156 are angled toward one another and meet at the center of the barb 156. In this configuration, the barb 156 is V-shaped. The first point 158 and the second point 160 can extend outward and toward the insertion end 20 of fastener 10 and be of similar sizes and lengths. In other examples, the first point 158 and the second point 160 have different sizes and lengths.

Figure 8:
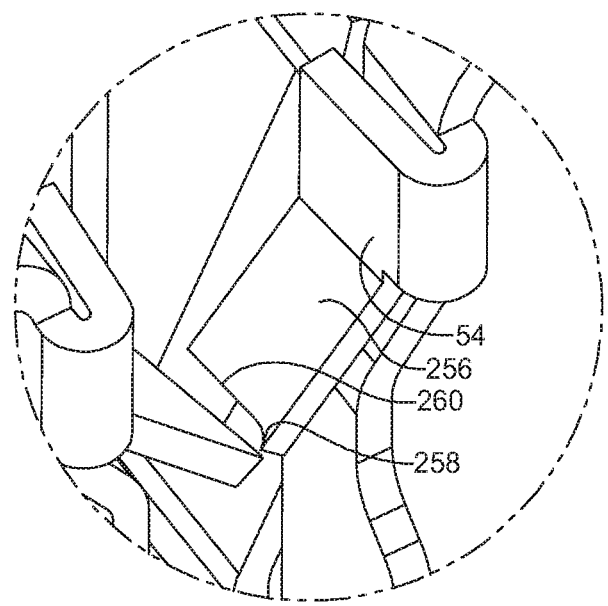
FIG. 8 is a magnified view of another alternative barb that can be used in accordance with the present disclosure.

In another example barb configuration, the barb can include a point and a flat section. As shown in FIG. 8, a barb 256 includes a point 258 and a flat section 260. In this example, the point 258 extends further downward and inward than the flat section 260. The flat section 260 extends across a portion of the width of the barb 256 in a substantially parallel relationship to the insertion end 20 of the fastener 10. In other examples, the flat section 260 runs at an angle such that it is not parallel to the insertion end 20. The point 258, in these other examples, still extends downward from the flat section 260. In still other example configurations of the barbs, variations of the foregoing specific examples can be used such as points located in different locations along the width of the barbs and points including rounded or flat ends.

In the example barbs shown in FIGS. 6-8, the barbs 52, 156, 256 have a width that is shown as less than the width of the first barb extension 50 or the third barb extension 54. Thus, a portion of the first barb extension 50 can extend laterally beyond both the lateral side edge 24 of the body 12 and the lateral side edge 24 or the barb 52, 156, 256. As shown in FIG. 6, the width $W_e$ corresponds to the portion of the width of the first barb extension 50 that overlaps the first side 16 of the body 12. The width $W_b$ corresponds to the width of the barb 52. In other embodiments, the width of the first barb 52 can be substantially the same as the width of the first barb extension 50.

In existing designs, the barbs often include thin flat distal ends that are substantially parallel to an insertion edge of the fastener. This orientation disposes the thin distal edge of the barb essentially parallel to an outer surface of the rib being inserted into the fastener. This orientation and the designs of existing barbs can cause existing barbs to sink into the rib, resulting in existing fasteners becoming loose and permitting the relative movement of joined components. By orienting a portion of the distal edge of a relatively wide barb at an angle to the surface of the rib and/or by including a flat portion adjacent the point or such a relatively wide barb, as described in example barbs 52, 156 and 256, the surface area of the barb contacting the rib is increased. This results in a lower likelihood that the barb will problematically sink into or otherwise damage the rib and permit relative movement of joined components.

The example barbs according to the present disclosure have a width that is relatively larger than the width of existing barb designs when compared to the length of the barb. As shown in FIG. 6, for example, the width $W_b$ is the width of the barb 52 measured along the barb 52 from is lateral outer edge to its inner edge. The length $L_b$ is the length of the barb 52 measured from the bend 66 where the barb 52 is joined to the first barb extension 50 to the point 72. In this example, the width $W_b$ is greater than one half of the length $L_b$. In other examples, the width of the barb can have other relative proportions to its length. In another example, the width $W_b$ can be greater than one third of the length $L_b$. In still other examples, the ratio of the width $W_b$ to the length $L_b$ of the barb can have values equal to or greater than $\frac{1}{5}$ or $\frac{1}{4}$.

The example barb 52 has a width $W_b$ of 2.5 mm and a length $L_b$ of 2.3 mm. Other example barbs can have different widths and different lengths. Other examples of the size of the barb include a width $W_b$ of 1.0 mm with a length $L_b$ of 7.3 mm, a width $W_b$ of 1.3 mm with a length $L_b$ of 5.7 mm and a width $W_b$ 1.2 mm with a length $L_b$ of 6.0 mm.

As further shown in FIG. 6 and as described above, the example barb 52 is shaped with the point 72 located at the distal end 68. The point 72 is located at the intersection of the lateral outer edge 76 and a distal edge 88. The orientation of the lateral outer edge 76 relative to the distal edge 88 defines a barb angle A. The barb angle A, in the example shown is 45 degrees. In other examples, the barb angle A can have other sizes. In other examples, the barb angle A is in the range of 30 degrees to 90 degrees or in the range of 45 degrees to 90 degrees. In still another example, the barb angle A is in the range of 3.5 to 10 degrees.

Figure 9:
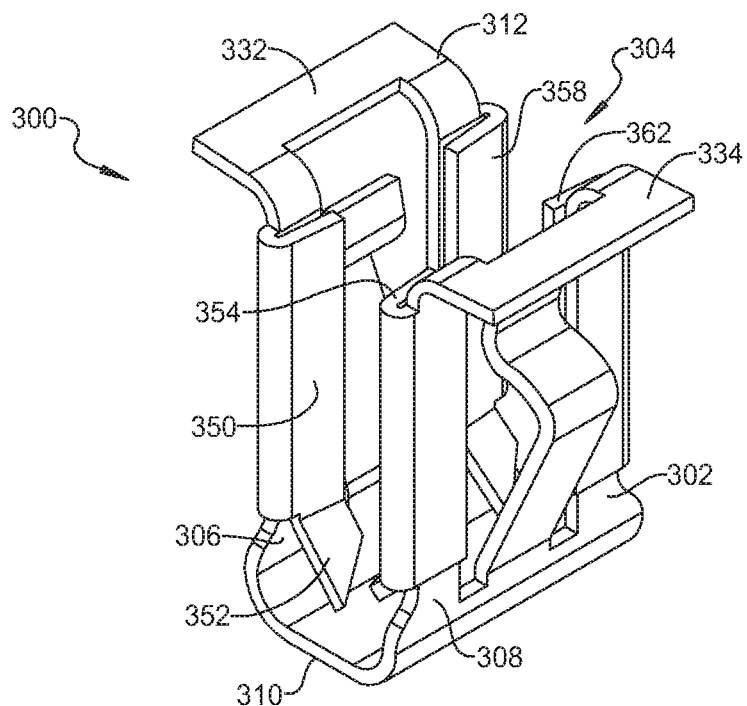
FIG. 9 is a perspective view of another example fastener in accordance with the present disclosure.
Figure 10:
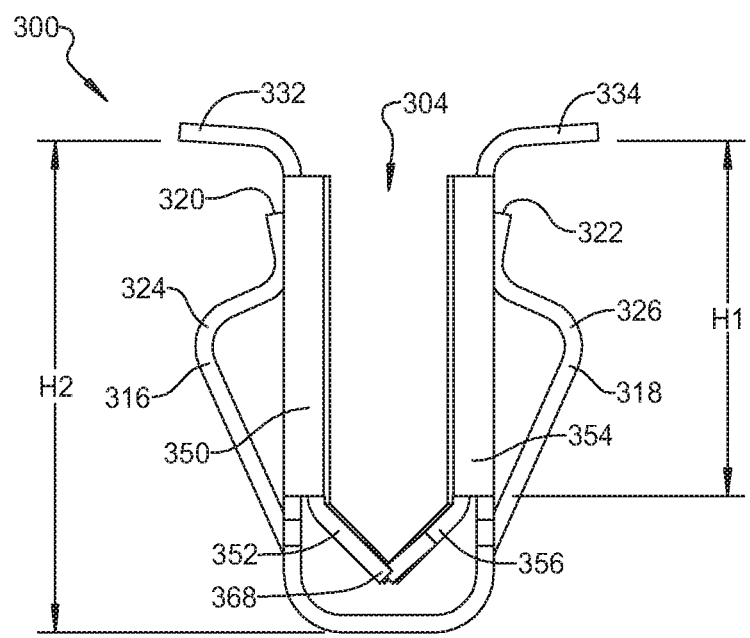
FIG. 10 is a side view of the fastener shown in FIG. 9.
Figure 11:
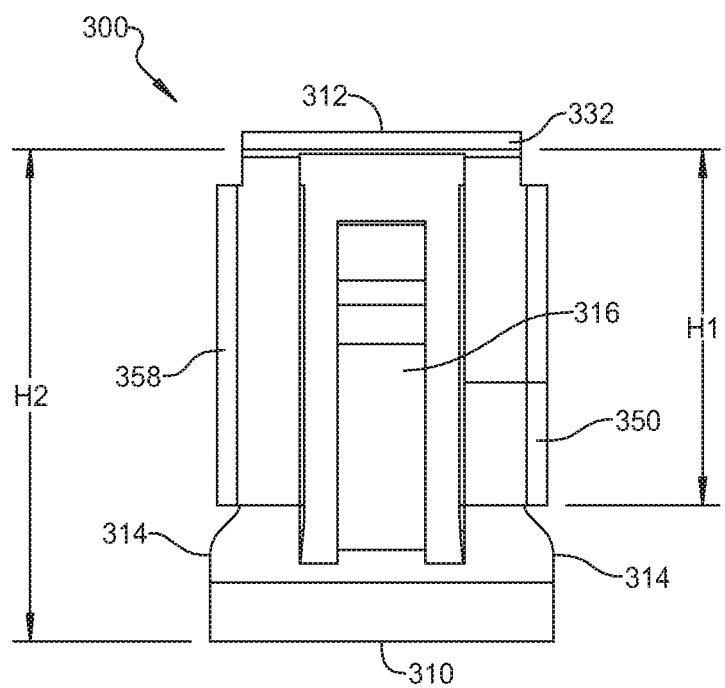
FIG. 11 is a front view of the fastener shown in FIG. 9.

FIGS. 9-11 show another example fastener 300. The fastener 300 is similar to fastener 10 in many respects but includes a barb configuration that is positioned closer to an insertion end 310. As shown, the fastener 300 includes a body 302 with a first side 306 and a second side 308. The first side 306 and the second side 308 are positioned parallel to each other to define a central cavity 304 and extend from the insertion end 310 to a trailing end 312. At the trailing end 312, the fastener 300 can include a first flange 332 and a second flange 334 that extend laterally across the first side 306 and the second side 308, respectively. The first flange 332 can extend orthogonally outward from the first side and the second flange 334 can extend orthogonally outward from the second side 308. The first flange 332 and the second flange 334, in this example, each extend away from the central cavity 304.

The fastener 300 can also include one or more spring arms. In the example shown, fastener 300 includes a first spring arm 316 and a second spring arm 318. The first spring arm 316 and the second spring arm 318 are configured similarly to the first spring arm 34 and the second spring arm 36 of fastener 10. The first spring arm 316 and the second spring arm 318 extend away from the first side 306 and the second side 308, respectively, and away from the central cavity 304. The first spring arm 316 and the second spring arm 318 bend back toward the central cavity 304 at a first shoulder 324 and at a second shoulder 326. The first spring arm 316 and the second spring arm 318 then bend upwards toward the trailing end 312 of the fastener 300. The first spring arm 316 and the second spring arm 318 stop short of the first flange 332 and the second flange 334 at first terminating end 320 and at second terminating end 322, respectively.

As further shown in FIGS. 9-11, the fastener 300 can also include a first barb extension 350, a second barb extension 358, a third barb extension 354, a fourth barb extension 362, a first barb 352, a second barb 360, a third barb 356 and a fourth barb 364. As with the previously described example, each of the four barb extensions and each of the four barbs in the example fastener 300 are similar to one another. The first barb extension 350 and the first barb 352 are hereinafter described but it should be appreciated that the other barb extensions and the other barbs can have a similar structure be disposed on an opposite side of the fastener 300.

As shown, the first barb 352 is connected to the body 302 of the fastener 300 by the first barb extension 350. The first barb extension 350 extends laterally away from the first lateral side edge 314 of the first side 306. The first barb extension 350 then bends back toward the central cavity 304 of the body 302 such that a portion of the first barb extension 350 overlaps the inner surface of first side 306. As such, the first barb extension 350 is disposed between the first side 306 and the second side 308 in the central cavity 304.

As further shown in FIG. 9, the bent portion of the first barb extension 350 has a rounded shaped so that the bent portion of the first barb extension 350 has a U-shape that extend laterally from and outside the lateral side edge. The bent portion of the first barb extension 350 can have other shapes or profiles as well. The bent portion of the first barb extension 350, in other examples, can have a V-shape or a rectangular shape or can be crimped such that it has a substantially flat profile.

As can be seen, the first barb extension 350 extends further downward along the first lateral side edge 314 from the first flange 332 than in the example fastener 10 previously described. The first barb extension 350 has a height, H1, as shown in FIGS. 10 and 11. In comparison, the first lateral side edge 314 has a height, H2. The heights, H1 and H2, are the vertical distances between the trailing end 312 and the insertion end 310 of the fastener 300 and an insertion end of the barb extensions, respectively. In the example shown in FIGS. 9-11, the height H1 is greater than half of the height H2. This configuration can dispose a distal end 368 of the first barb 352 at or below the vertical location where the first spring arm 316 begins to extend away from the first side 306.

In another example, the distal end 368 of the first barb 352 can be disposed inside the central cavity 304 at a vertical height between the location of the first shoulder 324 and the location where the first spring arm 316 begins to extend away from the first side 306. In another example, the distal end 368 of the first barb can be disposed inside the central cavity 304 at a vertical height between the location of the first shoulder 324 and the insertion end 310. In still another example, the relative size of the height H1 to that of H2 can be different from that described above. For example, as shown in the example fastener 10 on FIGS. 2-5, the height H1 can be less than half of the height H2.

Figure 12:
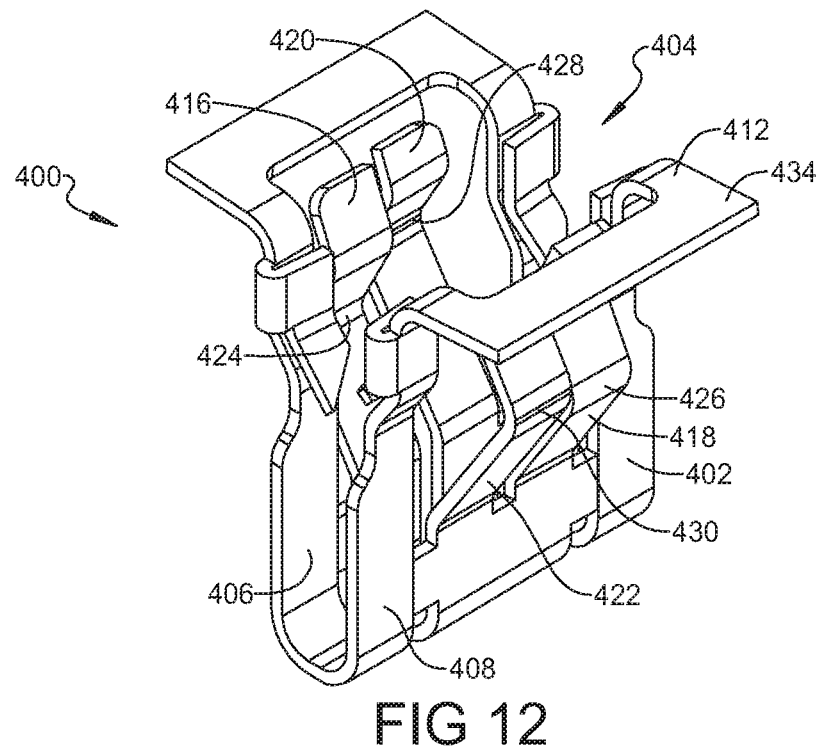
FIG. 12 is a perspective view of yet another example fastener in accordance with the present disclosure.
Figure 13:
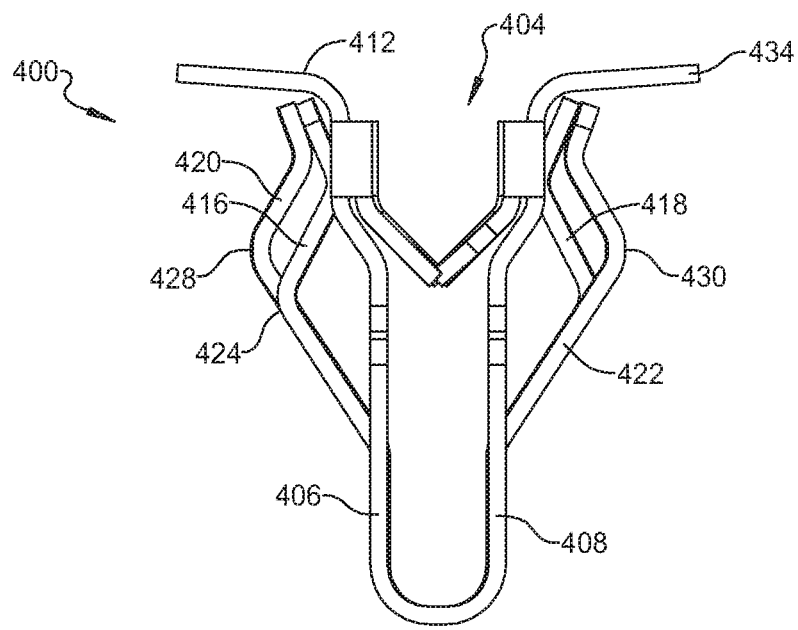
FIG. 13 is a side view of the example fastener of FIG. 12.
Figure 14:
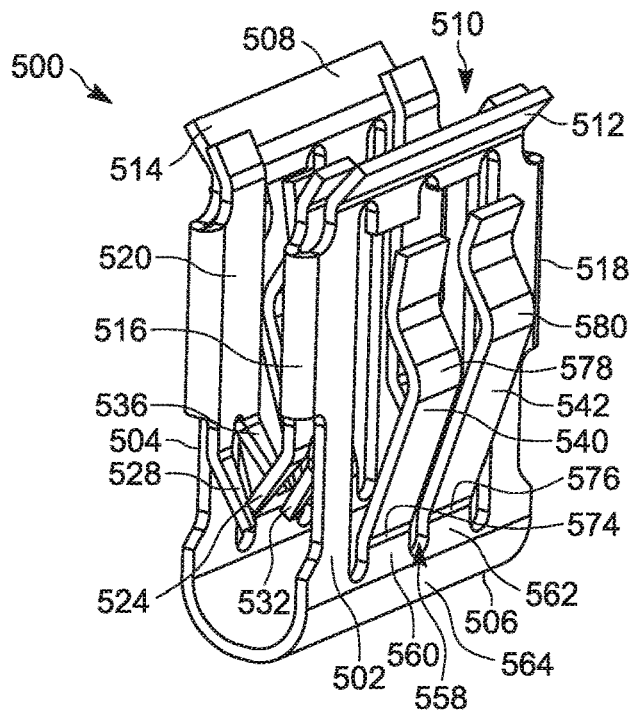
FIG. 14 is perspective view of another example fastener in accordance with the present disclosure.

Still another example fastener 400 is shown in FIGS. 12 and 13. Many of the previously described features are similar in this embodiment. Fastener 400 includes a body 402, a central cavity 404, a first spring arm 416 and a second spring arm 418. In this embodiment, the fastener 400 also includes a third spring arm 420 and a fourth spring arm 422. The addition of the third spring arm 420 and the fourth spring arm 422 in this embodiment permits the fastener 400 to have the additional flexibility of being compatible with a wider variety of components since the additional spring arms permit fastener 400 to secure to a wider range of material thicknesses.

As shown in FIGS. 12 and 13, the first spring arm 416 and the third spring arm 420 can extend outward from a first side 406 toward a trailing end 412 of the fastener 400. The second spring arm 418 and the fourth spring arm 422 can similarly extend outward toward the trailing end 412 but extend from a second side 408. The second spring arm 418 and the fourth spring arm 422 can extend outward before bending back toward the second side 408 at a second shoulder 426 and a fourth shoulder 430, respectively. The second shoulder 426 and the fourth shoulder 430 can be located below a flange 434 at the trailing end 412 of the second side 408. The vertical distances between the flange 434 to the second shoulder 426 and to the fourth shoulder 430 are different. This configuration of the fastener 400 permits it to be used with multiple different second components having different material thicknesses.

The first spring arm 416 and the third spring arm 420 are located on the first side 406. The first spring arm 416 and the third spring arm 420 are similarly configured as previously described with a first shoulder 424 and a third shoulder 428. With this configuration, the first spring arm 416 and the third spring arm 420 are able to accommodate the same variety of material thickness as the second spring arm 418 and the fourth spring arm 422.

In this embodiment, the first spring arm 416 and the second spring arm 418 are positioned laterally offset from one another as shown in FIG. 12. The third spring arm 420 and the fourth spring arm 422 are also laterally offset from one another. In this manner, the retention forces provided by the complimentary spring arms are laterally distributed across the second component so that rotation or twisting of the fastener 400 is minimized.

Referring now to FIGS. 14-17, another example fastener 500 is shown. The example fastener 500 can include many of the features of the example fasteners 10, 300 or 400. As can be appreciated and where applicable, the previously described features and functionality that can be used in connection with the example fastener 500 need not be described again in detail herein.

As shown, the fastener 500, in this example, includes a first side 502, a second side 504, an insertion end 506 and a terminating end 508. The example fastener 500 is U-shaped with the first side 502 positioned opposite to the second side 504. The first side 502 can be connected to the second side 504 by the rounded insertion end 506 to form a central body cavity 510. As previously described, the central body cavity 510 can receive the rib 82 between the first side 502 and the second side 504. The terminating end 508 is positioned at an end of the fastener 500 opposite to the insertion end 506. The terminating end 508 can include a first flanged portion 512 on the first side 502 and a second flanged portion 514 on the second side 504. The first flanged portion 512 and the second flanged portion 514 can be angled outwardly and away from the central body cavity 510. In this manner, the first flanged portion 512 and the second flanged portion 514 can assist in guiding the rib 82 into the central body cavity 510.

The example fastener 500 can also include a first barb extension 516, a second barb extension 518, a third barb extension 520 and a fourth barb extension 522. As previously described, the first barb extension 516, the second barb extension 518, the third barb extension 520 and the fourth barb extension 522 are connected to lateral sides edges of the fastener 500 and are bent or folded back into the central body cavity 510 between the first side 502 and the second side 504. One or more barbs can be connected at distal end of the first barb extension 516, the second barb extension 518, the third barb extension 520 and/or the fourth barb extension 522. The barbs are angled inward and toward a center of the central body cavity 510 such that barbs can grip the rib 82 to retain the rib 82 in the central body cavity 510.

In the example shown in FIGS. 14-17, the fastener 500 includes a pair of barbs connected to each of the first barb extension 516, the second barb extension 518, the third barb extension 520 and the fourth barb extension 522. As shown, the fastener includes a first barb 524, a second barb 526, a third barb 528, a fourth barb 530, a fifth barb 532, a sixth barb 534, a seventh barb 536 and an eighth barb 538. The barbs can be positioned at different vertical heights in the central body cavity 510. In the example shown, the first barb 524 and the fifth barb 532 are connected to the first barb extension 516. The first barb 524 and the second barb 526 are angled along substantially the same angle from the first barb extension 516 but begin bending outward at different vertical heights relative to the insertion end 506. As such, the ends of the first barb 524 and the second barb 526 terminate at different vertical heights in the central body cavity 510. Such variation between the barbs can cause the barbs to grip different portions of the rib 82 when it is inserted into the fastener 500.

In the example shown, each pair of barbs on the first barb extension 516, the second barb extension 518, the third barb extension 520 and the fourth barb extension 522 can have different profiles from that previously described. Opposing pairs of barbs (i.e., the first and fifth barbs versus the third and seventh barbs) can be staggered so that the barbs that are positioned directly opposite to one another are positioned at the different vertical heights relative to the insertion end 506. In other examples, the barbs can configurations as those described with respect to fasteners 10, 300 or 400 or can have other configurations.

The fastener 500, in this example, includes four spring arms. The first side 502 can include a first spring arm 540 and a second spring arm 542 and the second side 504 can include a third spring arm 544 and a fourth spring arm 546. The spring arms of the fastener 500 can be similar to that previously described for the example fastener 400. Each of the four spring arms, in the example shown, is angled outward and away from the central body cavity 510. The first and second spring arms 540, 542 extend outward and away from the first side 502 and the third and fourth spring arms 544, 546 extend outward and away from the second side 504.

As previously described with respect to fastener 400, the spring arms of the fastener 500 can bend back toward the central cavity at different vertical heights relative to the terminating end 508. As shown, the first spring arm 540 can bend back toward the central body cavity 510 at a first shoulder 578 and the second spring arm 542 can bend back toward the central body cavity 510 at a second shoulder 580. The first shoulder 578 can be positioned at a different vertical height relative to the terminating end 508 than the second shoulder 580. As can be appreciated (and as discussed above), this permits the fastener 500 to retain panels having different material thickness. For example, the first shoulder 578 is positioned at a greater vertical distance from the terminating end 508 than the second shoulder 580. In this type of configuration, the first spring arm 540 can hold a panel having a larger thickness than the second spring arm 542.

Figure 15:
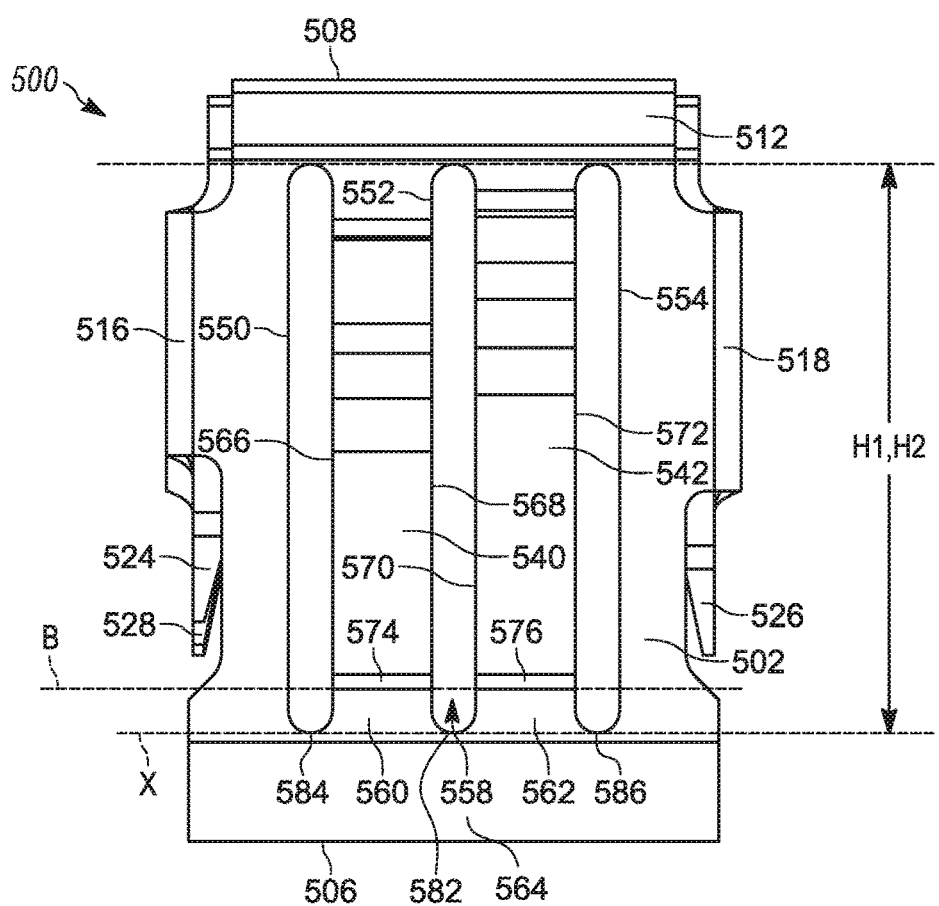
FIG. 15 is a front view of the fastener shown in FIG. 14.
Figure 16:
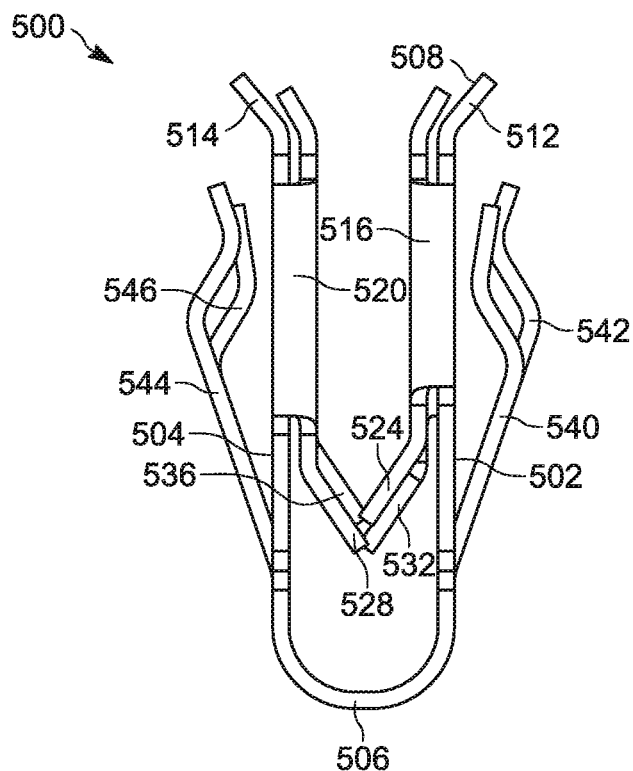
FIG. 16 is a side view of the fastener shown in FIG. 14.
Figure 17:
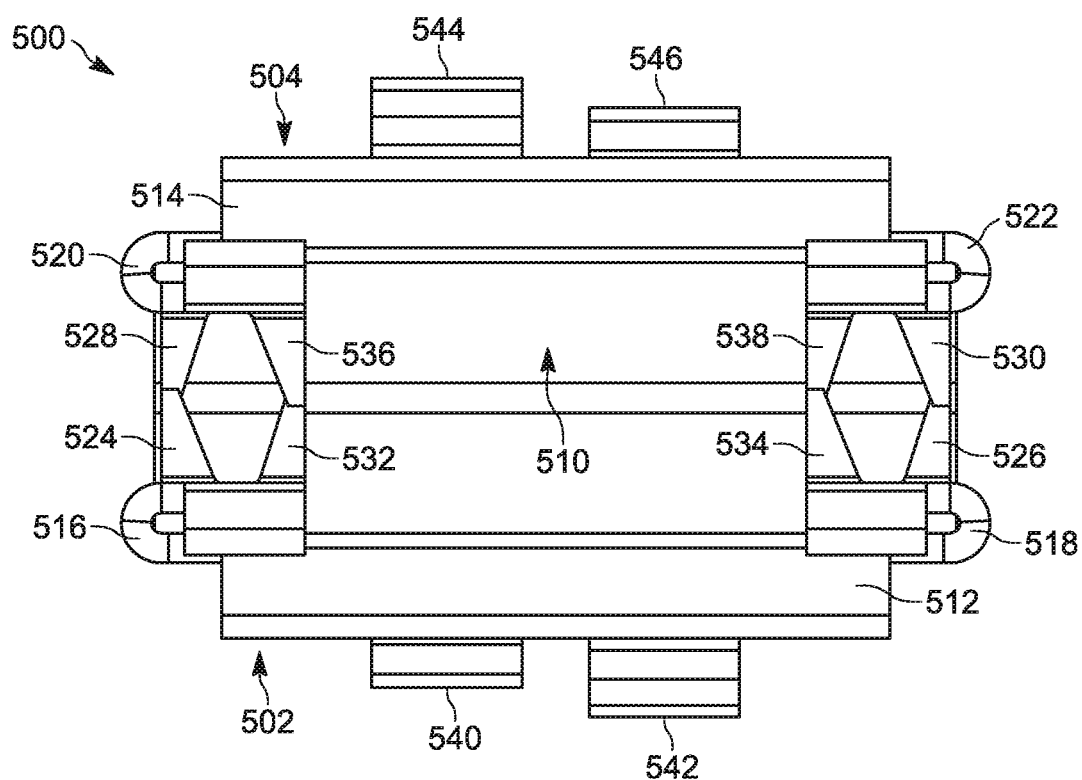
FIG. 17 is a top view of the fastener shown in FIG. 14.

When viewed from the front (as shown in FIG. 15), the fastener 500 can include a first slot 550, a second slot 552 and a third slot 554. The first slot 550 is defined by the side wall of the first side 502 and the outer lateral edge 566 of the first spring arm 540. The second slot 552 is defined by the inner lateral edge 568 of the first spring arm 540 and the inner lateral edge 570 of the second spring arm 542. The third slot 554 is defined by the outer lateral edge 572 of the second spring arm 542 and the side wall of the first side 502. As shown, the first slot 550, the second slot 552 and the third slot 554 can have substantially the same vertical heights and lateral widths and be positioned parallel to one another. As can be appreciated, the first slot 550 separates the first spring arm 540 from the first side 502 such that the first spring arm 540 can flex relative to the first side 502. Similarly, the third slot 554 can separate the second spring arm 542 from the first side 502 to similarly flex independently of the first side 502.

The second slot 552 is positioned between the first spring arm 540 and the second spring arm 542. As such, the second slot 552 can permit the first spring arm 540 to flex relative to the first side 502 independently of the second spring arm 542.

The first spring arm 540 and the second spring arm 542 are permitted to flex independently from each other because the first spring arm 540 and the second spring arm 542 are separated from each other by a gap 558. The gap 558 can be a portion of the previously described second slot 552. The first spring arm 540 and the second spring arm 542 are connected to the first side 502 at a first connecting end 560 and at a second connecting end 562, respectively. The gap 558 (or lower portion of the second slot 552) is positioned between the first connecting end 560 and the second connecting end 562. As shown in FIGS. 14-17, the gap 558 of example fastener 500 can be positioned adjacent to and/or at substantially the same vertical height (relative to the insertion end 506) as the first connecting end 560 and the second connecting end 562.

As shown in FIG. 15, the first connecting end 560 and the second connecting end 562 can be positioned at a height X above the insertion end 506 on the first side 502. The gap 558 can be positioned at the same vertical height X as shown. As further described below, other examples of the fastener of the present disclosure can include gaps 558 that extend past the height X or past the first and second connecting ends 560, 562.

As further shown, the first spring arm 540 can bend away from the first side 502 at a first bend 574. Similarly, the second spring arm 542 can bend away from the first side at a second bend 576. In the example shown in FIG. 15, the first bend 574 and the second bend 576 are vertically aligned. In this manner, the first bend 574 and the second bend 576 can define a bend line B. The gap 558, as shown, extends toward the insertion end 506 past the bend line B (i.e., past the first bend 574 and past the second bend 576). As will be further described below, the gap 558 can extend to various degrees past the bend line B. In one example, the gap 558 can extend past the bend line B and/or past the first bend 574 and the second bend 576 at least 1 mm. In another example, the gap 558 can extend past the first bend 574 and/or the second bend 576 at least 3 mm.

As described above, the first spring arm 540 includes the outer lateral edge 566 that is spaced apart from the first side 502. Similarly, the second spring arm 542 includes the outer lateral edge 572 that is also spaced apart from the first side 502. The inner lateral edge 568 of the first spring arm 540 is spaced apart from the inner lateral edge 570 of the second spring arm 542. In the example of FIG. 15, an outer lateral height H1 of the outer lateral edge 566 of the first spring arm 540 is equal to an inner lateral height H2 of the inner lateral edge 568 of the first spring arm 540. The outer lateral height H1 of the outer lateral edge 572 of the second spring arm 542 can be equal to the inner lateral height H2 of the inner lateral edge 570 of the second spring arm 542. In other example fasteners (described below), the inner lateral height H2 can be longer than the outer lateral height H1 such that the gap 558 (and/or the second slot 552) can extend further toward the insertion end 506 than the outer lateral edges of the first spring arm 540 and/or the second spring arm 542.

As further shown, the first slot 550 can have a connecting edge 584 and the third slot 554 can have a connecting edge 586. The connecting edges 584, 586 are positioned at or near the first connecting end 560 and the second connecting end 562, respectively. The outer lateral edge 566 of the first spring arm 540 connects to the first side 502 at the connecting edge 584 and the outer lateral edge 572 of the second spring arm 542 connects to the first side at the connecting edge 586. The inner lateral edge 568 of the first spring arm 540 and the inner lateral edge 570 of the second spring arm 542 are connected at a base edge 582. In the example shown, the connecting edges 584, 586 are positioned at the same vertical height (with respect to insertion end 506) as the base edge 582. In other examples and as further described below, the base edge 582 can be positioned closer to the insertion end 506 than the connecting edges 584, 586.

The example fastener 500 can also include a bridging portion 564. The bridging portion 564 is a portion of the fastener 500 that connects the lateral halves of the fastener 500 to each other. The bridging portion 564 is the material at the insertion end 506 that is positioned adjacent to (or in) the gap 558 that connects the lateral half of the fastener 500 (the half including the first spring arm 540 and the third spring arm 544) to the opposite lateral half of the fastener 500 (the opposite half that includes the second spring arm 542 and the fourth spring arm 546). The bridging portion 564 can have a circumferential length L (see FIG. 22, for example) that is measured circumferentially around the insertion end 506 from the gap 558 on the first side 502 to the gap 558 on the second side 504. In various examples, the bridging portion 564 can have various size lengths.

As can be appreciated, the fastener 500 can include substantially the same structure and configuration as that previously described on the second side 504. The third spring arm 544 and the fourth spring arm 546 can be similarly separated and permitted to independently flex relative to the second side 504. The third spring arm 544 and the fourth spring arm 546 can also be separated by a gap 558. In such examples, the gap 558 on the second side 504 can be laterally aligned with the gap 558 on the first side 502 such that the gaps extend around the insertion end 506 toward one another. In other examples, the gap 558 can have other sizes or can have other positions relative to the first and second spring arms 540, 542 and/or the third and fourth spring arms 544, 546.

Figure 18:
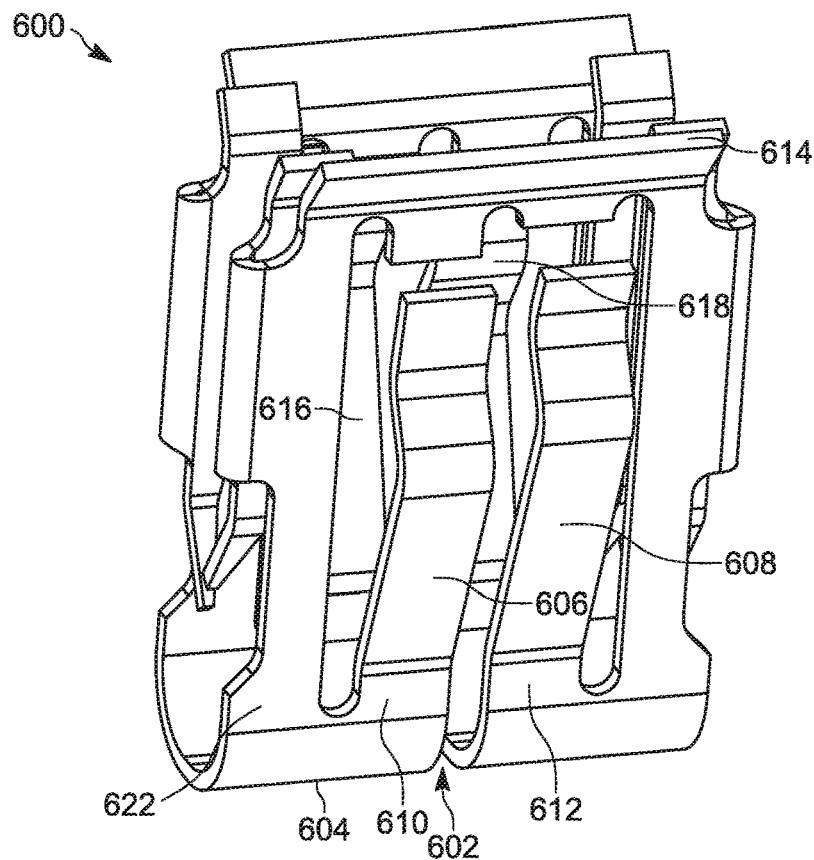
FIG. 18 is a perspective view of another example fastener in accordance with the present disclosure.
Figure 19:
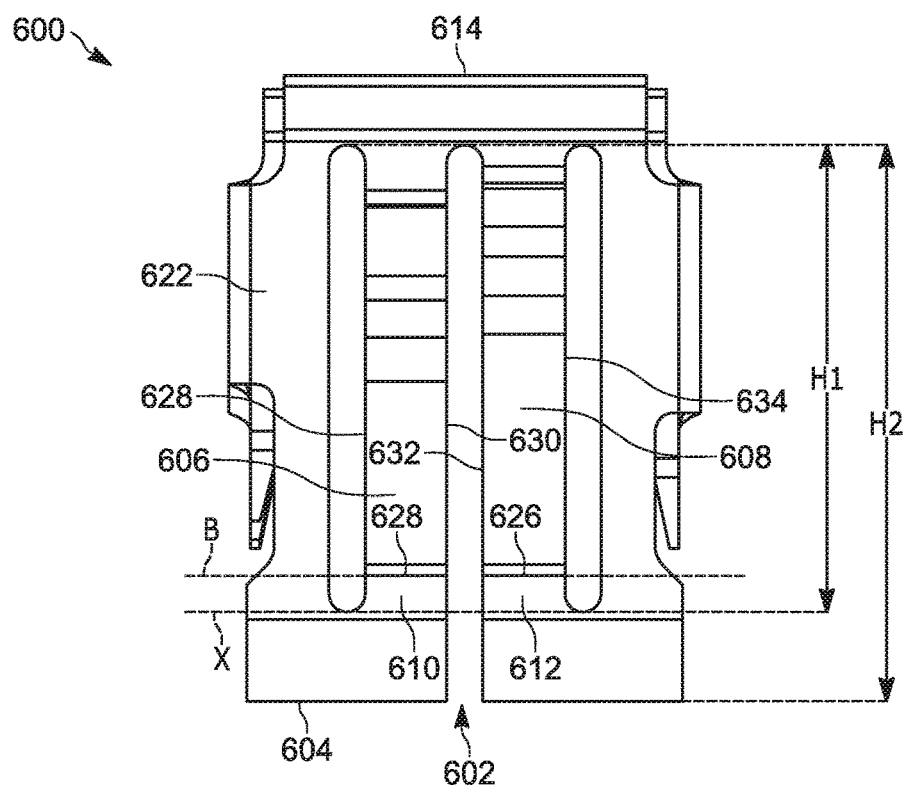
FIG. 19 is a front view of the fastener shown in FIG. 18.

Referring now to FIGS. 18 and 19, the example fastener 600 includes a gap 602 that extends through the insertion end 604. The example fastener 600 includes a four spring arm configuration substantially similar to that described. In this example, however, the first spring arm 606 and the second spring arm 608 are not connected to one another at the insertion end 604. The gap 602 extends past (and below) the first connecting end 610 of the first spring arm 606 and past (and below) the second connecting end 612 of the second spring arm 608. In this example, the first spring arm 606 and the second spring arm 608 are only connected indirectly to one another at the trailing end 614. Similarly, the third spring arm 616 and the fourth spring arm 618 are not connected to one another at the insertion end 604 and are only connected indirectly to one another at the trailing end 614. In this example, the bridging portion of example fastener 600 has a length of zero.

As shown on FIG. 19, the first connecting end 610 and the second connecting end 612 define a vertical height X that is positioned above the insertion end 604. The gap 602, in this example, can extend past the vertical height X. As further shown, the first spring arm 606 bends outward from the first side 622 at the first bend 624 and the second spring arm 608 bends outward from the first side 622 at the second bend 626. The first bend 624 and the second bend 626 are vertically aligned in this example and can define a bend line B. The gap 602 can extend toward the insertion end 604 past the first bend 624 and/or the second bend 626 (or past the bend line B).

The first spring arm 606 can further include the outer lateral edge 628 and the inner lateral edge 630. The second spring arm 608 can include the inner lateral edge 632 and the outer lateral edge 634. As shown, the outer lateral edge 628 of the first spring arm 606 and/or the outer lateral edge 634 of the second spring arm 608 can have a vertical height H1 relative to the insertion end 604. The inner lateral edge 630 of the first spring arm 606 and the inner lateral edge 632 of the second spring arm 608 can have a vertical height H2 relative to the insertion end 604. As shown, the vertical height H2 is longer than the vertical height H1.

Figure 20:
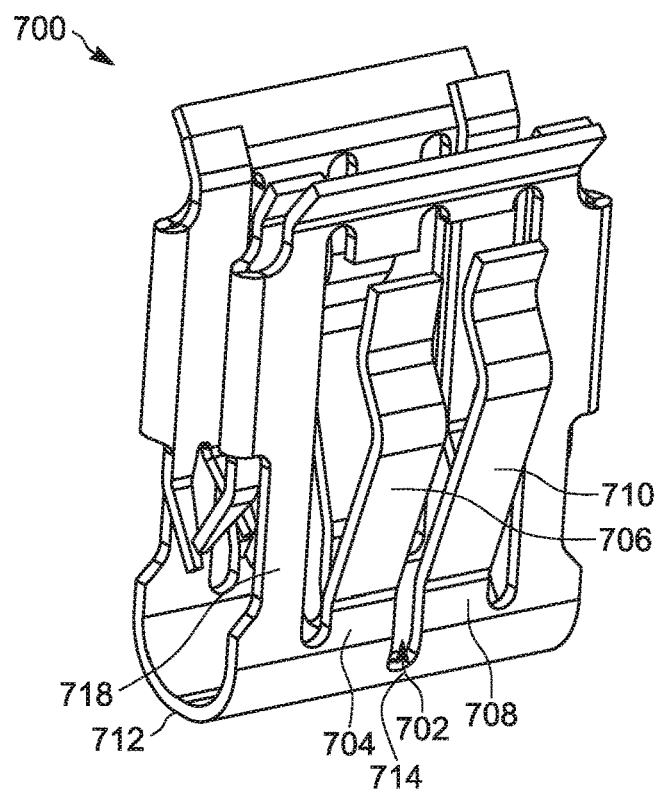
FIG. 20 is a perspective view of another example fastener in accordance with the present disclosure.
Figure 21:
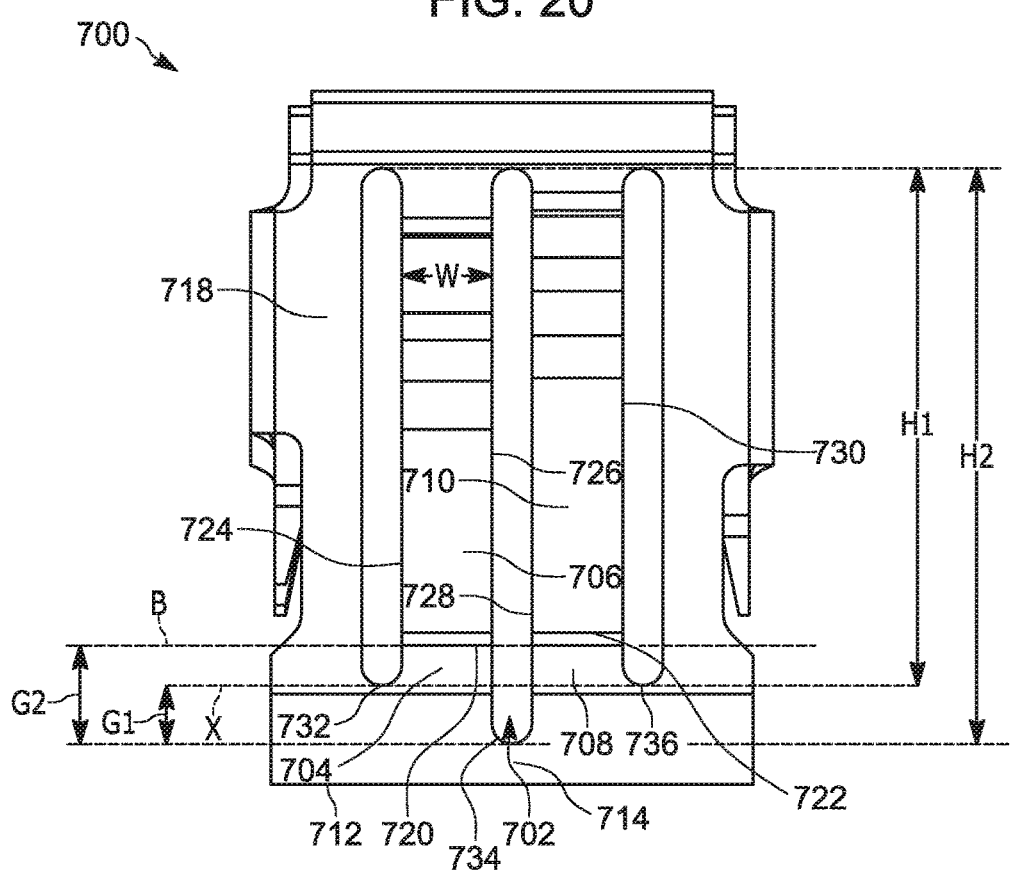
FIG. 21 is a front view of the fastener shown in FIG. 20.

Referring now to FIGS. 20 and 21, still another example fastener 700 is shown. In this example, the fastener 700 has a gap 702 that extends past (or below) a first connecting end 704 of a first spring arm 706 and past (or below) a second connecting end 708 of a second spring arm 710. As can be seen in FIG. 21, the gap 702 extends further toward the insertion end 712 that the slots positioned at the lateral outer sides of the first spring arm 706 and the second spring arm 710. The first connecting end 704 and the second connecting end 708 can define a vertical height X positioned above the insertion end 712. The gap 702 extends toward the insertion end 712 such that the edge of the gap 702 proximal the insertion end 712 is positioned at a vertical height of G1 as shown. In this example, the vertical height G1 (at which the base edge 734 of the gap 702 is vertically located) is less than the vertical height X such that the gap 702 extends past the first connecting end 704 and the second connecting end 708. In some examples, the gap 702 can extend past the first connecting end 704 and/or the second connecting end 708 by more than 1 mm. In other examples, the gap 702 can extend past the first connecting end 704 and/or the second connecting end 708 by 2 mm or more.

As further shown in this example, the first spring arm 706 bends outward from the first side 718 at the first bend 720 and the second spring arm 710 bends outward from the first side 718 at the second bend 722. The first bend 720 and the second bend 722 are vertically aligned in this example and can define a bend line B. The gap 702 can extend toward the insertion end 712 past the first bend 720 and/or the second bend 722 (or past the bend line B). The base edge 734 of the gap 702 is positioned at a vertical distance G2 below the bend line B. As can be seen, the vertical distance G2 is greater than the vertical distance G1 such that the gap 702 extends past the connecting edges 732, 736.

The first spring arm 706 can further include the outer lateral edge 724 and the inner lateral edge 726. The second spring arm 710 can include the inner lateral edge 728 and the outer lateral edge 730. As shown, the outer lateral edge 724 of the first spring arm 706 and/or the outer lateral edge 730 of the second spring arm 710 can have a vertical height H1 relative to the insertion end 712. The inner lateral edge 726 of the first spring arm 706 and the inner lateral edge 728 of the second spring arm 710 can have a vertical height H2 relative to the insertion end 712. As shown, the vertical height H2 is longer than the vertical height H1.

As can be appreciated, the gap 702 can extend to various distances past the bend line B and/or past the connecting edges 732, 736. For example, the vertical distance G2 can be 1 mm, 2 mm, or be more than 2 mm. The gap 702 can extend toward the insertion end 712 in order to cause the first spring arm 706 to flex inwardly and outwardly from the body of the fastener 700 independently from the second spring arm 710. In this manner, the fastener 700 can robustly and repeatedly secure to panels of various thicknesses. As shown in FIG. 21, the first spring arm 706 (and the second spring arm 710) can have a lateral width W. The gap 702 can extend past the first bend 720 and/or the second bend 722 toward the insertion end 712 by a vertical distance that is at least one-third the lateral width W of the first spring arm 706. In another example, the gap 702 can extend past the first bend 720 and/or the second bend 722 toward the insertion end 712 by a vertical distance that is at least one-half the lateral width W of the first spring arm 706. In such examples, the vertical distance G2 can measure one-third the lateral width W or one-half the lateral width W. In other examples, the gap 702 can extend to various distances from the bend line B (or extend completely around the insertion end 712).

Figure 22:
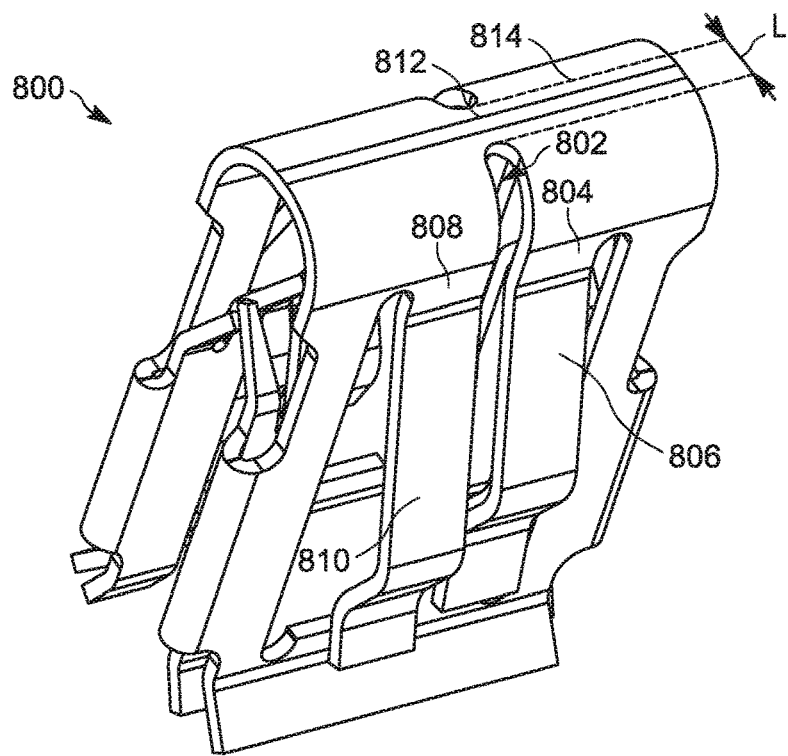
FIG. 22 is a perspective view showing an insertion end of another example fastener in accordance with the present disclosure.
Figure 23:
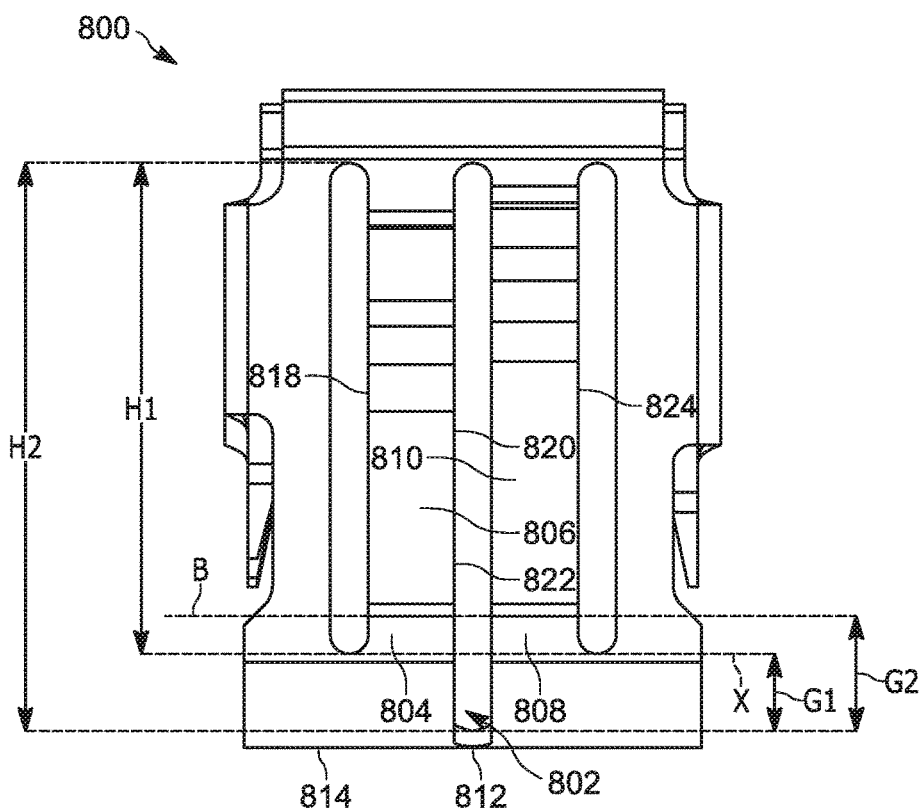
FIG. 23 is a front view of the fastener shown in FIG. 22.

In still another example as shown in FIGS. 22 and 23, a fastener 800 can include a gap 802 that extends into the insertion end 814. In this example, the gap 802 extends around the curved portion of the insertion end 814. The gap 802 extends past (or below) a first connecting end 804 of a first spring arm 806 and past (or below) a second connecting end 808 of a second spring arm 810. The example fastener 800 can have relationships and relative sizing as that previously described. The outer lateral edges 818, 824 of the first spring arm 806 and the second spring arm 810 can have vertical heights H1 that are shorter than the vertical height H2 of the inner lateral edges 820, 822 of the first spring arm 806 and the second spring arm 810.

As shown and as previously discussed, the fasteners of the present disclosure can have bridging portions of varying lengths. As shown in FIG. 22, the fastener 800 can have a bridging portion 812 that is positioned only at an apex of the rounded insertion end 814. In some examples, the bridging portion 812 can have a length L of 1 mm or less. In other examples, the bridging portion can have a length L of 3 mm or less. As shown in FIG. 20, the example fastener 700 can have a bridging portion that is longer than the bridging portion 812 of the fastener 800. The example fastener 700 can have a bridging portion 714 with a length of 3 mm or more. As shown in FIG. 18, the bridging portion can have a length of 0 mm. In such configurations, like the fastener 600, the first spring arm and the second spring arm are completely separated (or disconnected) from one another at the insertion end.

Figure 24:
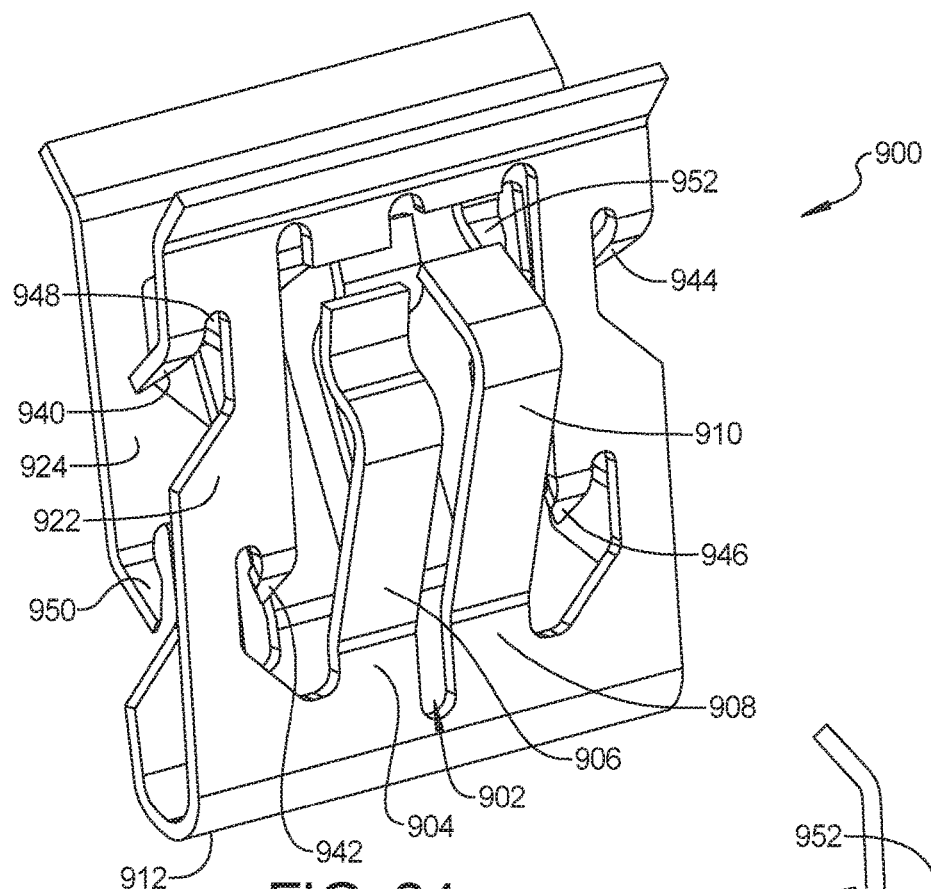
FIG. 24 is a perspective view of another example fastener in accordance with the present disclosure.
Figure 25:
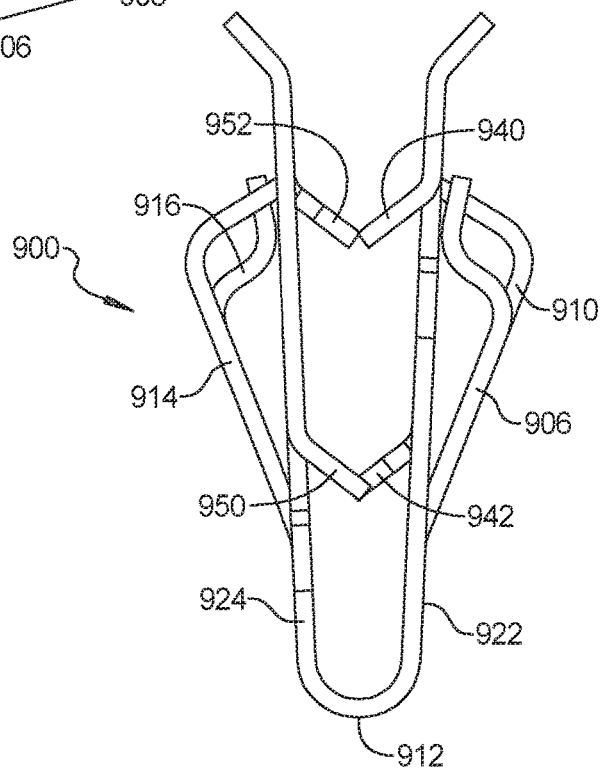
FIG. 25 is a side view of the fastener shown in FIG. 24.
Figure 26:
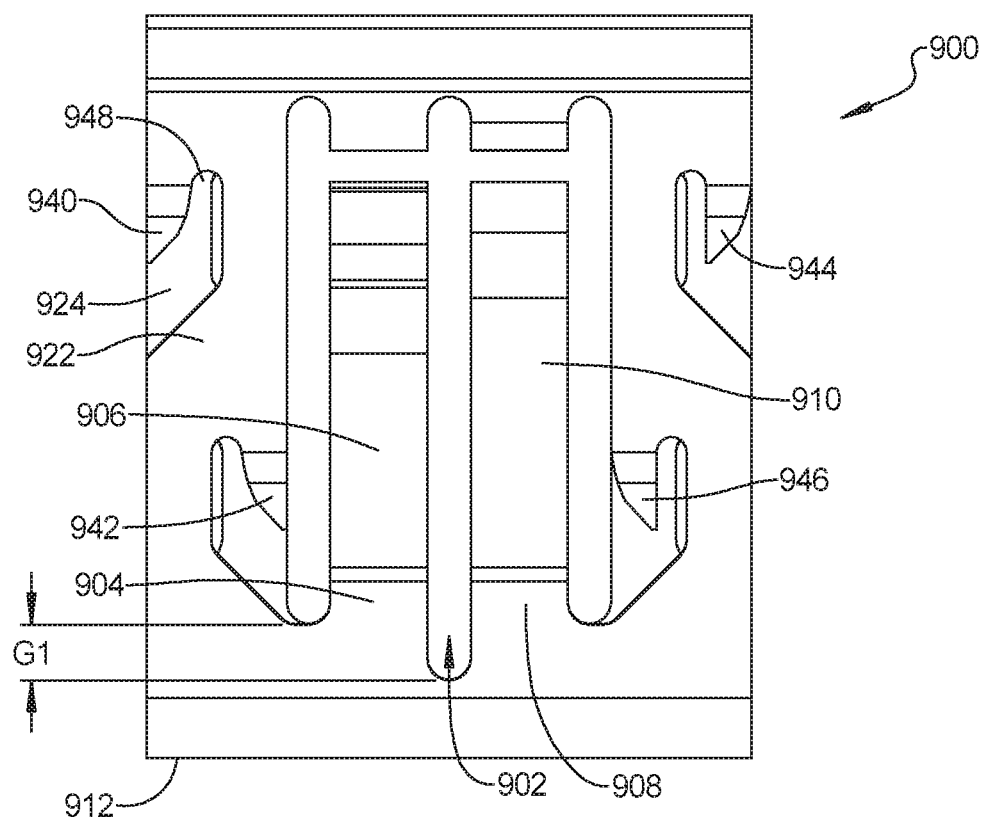
FIG. 26 is a front view of the fastener shown in FIG. 24.

Referring now to FIGS. 24-26, another example fastener 900 is shown. The example fastener 900 includes a gap 902 that extends below the adjacent first spring arm 906 and the second spring arm 910. The example fastener 900 includes a four spring arm configuration substantially similar to that previously described. The example fastener 900 is substantially similar to the example fastener 700 except that the barbs in this example are not connected to the fastener 900 by folded barb extensions. In addition, the first side 922 and the second side 924 are oriented at an acute angle with respect to each other rather than being substantially parallel to each other as previously described. As can be appreciated, the first side 922 and the second side 924 can be oriented substantially parallel to one another in this example as well.

In the example fastener 900, the first barb 940, the second barb 942, the third barb 944, the fourth barb 946, the fifth barb 948, the sixth barb 950, the seventh barb 952 and the eighth barb 954 are directly connected to the first side 922 or the second side 924. The first barb 940, the second barb 942, the third barb 944 and the fourth barb 946 may project inward from the first side 922 toward the insertion end 912. The fifth barb 948, the sixth barb 950, the seventh barb 952 and the eighth barb 954 may project inward from the second side 924 toward the insertion end 912. The barbs can be positioned at any suitable height along the first side 922 or the second side 924. In the example shown, the first barb 940 and the second barb 942 are staggered vertically and laterally on the fastener 900. Similarly, the third barb 944 is staggered vertically and laterally from the fourth barb 946. The fifth barb 948 is staggered vertically and laterally from the sixth barb 950 and the seventh barb 952 is staggered vertically and laterally from the eighth barb 954. In other examples, the barbs can have different relative positions or can be provided on the fastener 900 in different orientations.

As previously described with respect to the fastener 700, this example fastener 900 includes the first spring arm 906 and the second spring arm 910 that are separated from one another by the gap 902. In this example, the gap 902 extends further toward the insertion end 912 than the slots positioned at the lateral outer sides of the first spring arm 906 and the second spring arm 910.

The gap 902 extends toward the insertion end 912 such that the base edge of the gap 902 proximal the insertion end 912 is positioned at a vertical height of G1 as shown. In this example, the gap 902 extends past the first connecting end 904 and the second connecting end 908. In some examples, the gap 902 can extend past the first connecting end 904 and/or the second connecting end 708 by more than 1 mm. In other examples, the gap 902 can extend past the first connecting end 904 and/or the second connecting end 908 by 2 mm or more. In still other examples, the fastener 900 (with the barbs as shown) can include any of the previously described configurations of the gap 902.

Figure 27:
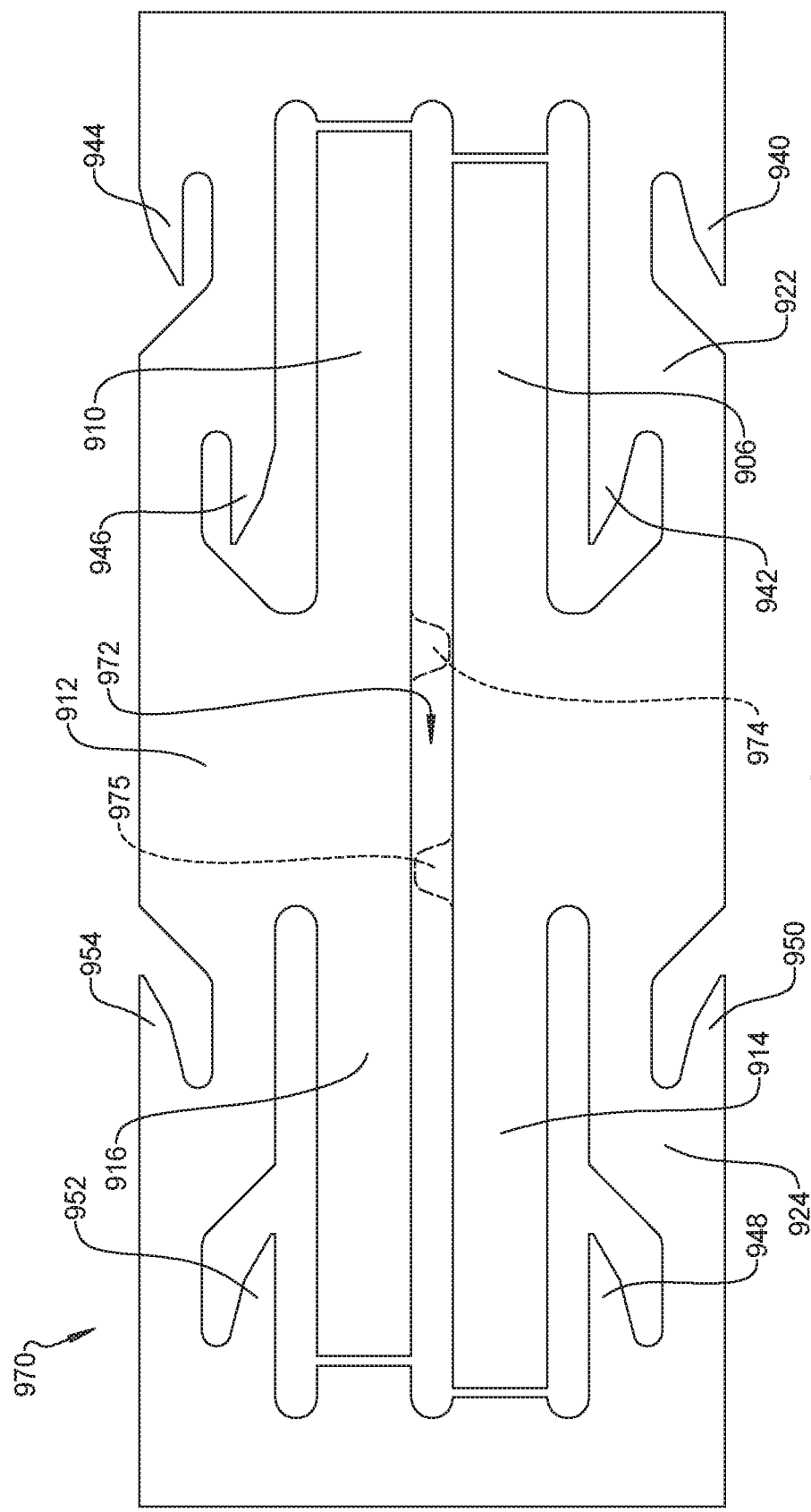
FIG. 27 is an example blank that can be formed into a fastener with a gap that completely separates adjacent spring arms.

Referring now to FIG. 27, an example blank 970 is shown. The blank 970 is a planar piece of spring steel or other suitable material that is formed with the profile as shown. The blank 970 can be formed in a suitable process such as stamping, laser cutting, or the like. The blank 970 can be subsequently formed to have the U-shape as depicted in the previous examples.

The blank 970, in the example shown, includes the first barb 940, the second barb 942, the third barb 944, the fourth barb 946, the fifth barb 948, the sixth barb 950, the seventh barb 952 and the eighth barb 954. In addition, the blank 970 includes the first spring arm 906, the second spring arm 910, the third spring arm 914 and the fourth spring arm 916. As can be appreciated, the blank 970 can be formed into a fastener that is substantially similar to the fastener 900 previously described.

The gap 972, however, in this example is different from the gap 902 as shown in FIGS. 24-26. The gap 972 is a continuous slot that completely separates the first spring arm 906 from the second spring arm 910. In this regard, the gap 972 is similar to the gap 602 previously described in example fastener 600 (FIGS. 18 and 19).

As shown, the blank 970 can include a first tab 974 and a second tab 976. The first tab 974 and the second tab 976, in this example, are projections of material that project laterally inside the gap 972. The first tab 974 is positioned on the first side 922 toward the insertion end 912 and the second tab 976 is positioned on the second side 924 toward the insertion end 912. The first tab 974 and the second tab 976 span laterally across the gap 972 but are not connected to the opposing side edge of the gap 972. While the first tab 974 and the second tab 976 may touch the opposing side edge of the gap 972, the gap 972 remains unconnected at the first tab 974 and the second tab 876 such that the first spring arm 906 and the second spring arm 910 can independently flex with respect to each other.

The first tab 974 and the second tab 976 can be included in the blank 970 to prevent the fastener from laterally pinching or squeezing together when the fastener is inserted in the second component 84 (FIG. 1). As can be appreciated, in fasteners in which the gap 972 does not include the first tab 974 and/or the second tab 976, it is possible that the lateral halves of the fastener that are formed from the blank 970 can pinch or squeeze laterally toward one another at the insertion end 912. In examples with the first tab 974 and/or the second tab 976, such pinching or squeezing can be prevented or minimized.

In the foregoing examples, the first spring arm and the second spring arm can be connected or completely separated from one another to varying degrees. The size and the position of the gap separating the first spring arm from the second spring arm can cause the first spring arm and the second spring arm to have differing abilities to flex independently of each other. This can advantageously permit the fastener to repeatedly and robustly grip and retain panels of varying thicknesses.

The fasteners of the present disclosure, including fasteners 10, 300, 400, 500, 600, 700, 800 and 900 are made of a suitable material such that various elements of the fastener can flex, bend or elastically deform to provide the functionality as previously described. In some circumstances, the resilient nature of the fasteners is produced by making the fastener from a suitable spring steel. In other circumstances, however, the fasteners of the present disclosure can be made of other metals, alloys, plastics or composite materials.

It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing descriptions of the example embodiments and example applications have been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A resilient U-base fastener for coupling a first component having a rib to a second component having an aperture therethrough, the resilient U-base fastener comprising:
    a U-shaped body defining a central rib receiving cavity between a first side and a second side, the first side connected to the second side at an insertion end, the central rib receiving cavity being designed to receive the rib;
    a first rib retention barb connected to the first side of the body and bending inwardly into the central rib receiving cavity and toward the insertion end, the first rib retention barb being positioned and designed to retain the rib within the central rib receiving cavity;
    a first aperture retention spring arm connected to the first side of the body and bending outwardly away from the central rib receiving cavity and away from the insertion end at a first bend, the first aperture retention spring arm being positioned and designed to engage a periphery of the aperture to retain the resilient U-base fastener within the aperture;
    a second aperture retention spring arm connected to the first side of the body adjacent the first aperture retention spring arm, the second aperture retention spring arm bending outwardly away from the central rib receiving cavity and away from the insertion end at a second bend, the second aperture retention spring arm being positioned and designed to engage the periphery of the aperture to retain the resilient U-base fastener within the aperture; and
    wherein the first aperture retention spring arm and the second aperture retention spring arm are laterally spaced apart from one another and are separated from one another by a gap in the first side of the body, wherein inner lateral edges of the first and second aperture retention spring arms, respectively, define opposite sides of the gap with the inner later edges and the gap in the first side of the body continuously extending from respective free distal ends of the first and second aperture retention spring arms toward the insertion end past the first bend and past the second bend.

2. The resilient U-base fastener of claim 1 wherein the gap extends at least 1 mm past the first bend.

3. The resilient U-base fastener of claim 1 wherein the gap extends past the first bend by a vertical distance of at least one-third of a lateral width of the first aperture retention spring arm.

4. The resilient U-base fastener of claim 1 wherein the first bend and the second bend are aligned at a vertical height above the insertion end to define a bend line, and the gap extends at least 1 mm past the bend line.

5. The resilient U-base fastener of claim 1 wherein:
    the first aperture retention spring arm includes a first shoulder at which the first spring aperture retention arm bends back toward the central rib receiving cavity;
    the second aperture retention spring arm includes a second shoulder at which the second aperture retention spring arm bends back toward the central rib receiving cavity; and
    the aperture retention first shoulder is positioned at a first vertical height relative to a trailing end of the fastener located opposite to the insertion end and is positioned and designed to engage and retain the periphery of the aperture in the panel having a first thickness related to the first vertical height, and the second aperture retention shoulder is positioned at a second vertical height relative to a trailing end of the fastener that is different from the first vertical height and is positioned and designed to engage and retain the periphery of the aperture in the panel having a second thickness related to the second vertical height.

6. A resilient U-base fastener for coupling a first component having a rib to a second component having an aperture therethrough, the resilient U-base fastener comprising:
    a U-shaped body defining a rib receiving cavity between a first side and a second side, the first side connected to the second side at an insertion end, the central rib receiving cavity being designed to receive the rib;
    a first rib retention barb connected to the first side of the body and bending inwardly into the central rib receiving cavity and toward the insertion end, the first rib retention barb being positioned and designed to retain the rib within the central rib receiving cavity;
    a first aperture retention spring arm connected to the first side of the body and bending outwardly away from the central rib receiving cavity and away from the insertion end, the first aperture retention spring arm being positioned and designed to engage a periphery of the aperture to retain the resilient U-base fastener within the aperture;
    a second aperture retention spring arm connected to the first side of the body adjacent the first aperture retention spring arm, the second aperture retention spring arm bending outwardly away from the central rib receiving cavity and away from the insertion end, the second aperture retention spring arm being positioned and designed to engage the periphery of the aperture to retain the resilient U-base fastener within the aperture; and
    wherein an inner lateral edge of the first aperture retention spring arm and an inner lateral edge of the second aperture retention spring arm define opposite sides of a gap in the first side that continuously extends from respective free distal ends of the first and second aperture retention spring arms toward the insertion end to separate the first aperture retention spring arm from the second aperture retention spring arm from one another, and the inner lateral edge of the first aperture retention spring arm has an inner vertical height that is longer than an outer vertical height of an outer lateral edge of the first aperture retention spring arm.

7. The resilient U-base fastener of claim 6 wherein the inner vertical height is at least 1 mm longer than the outer vertical height.

8. The resilient U-base fastener of claim 6 wherein a base edge of the gap connects the inner lateral edge of the first aperture retention spring arm to the inner lateral edge of the second aperture retention spring arm, and the base edge is positioned vertically closer to the insertion end of the body than respective base edges of outer lateral edges of the first and second aperture retention spring arms at which the respective base edges of the first and second aperture retention spring arms connect to the first side of the body.

9. The resilient U-base fastener of claim 6 comprising:
a first barb extension extending laterally outwardly from a first lateral side edge of the second side and being bent to support the first rib retention barb in the central rib receiving cavity; and
a second barb extension extending laterally outwardly from a second lateral side edge of the second side and being bent to support a second rib retention barb in the central rib receiving cavity, wherein the second rib retention barb extends inwardly and toward the insertion end, and wherein the second rib retention barb is positioned and designed to retain the rib within the central rib receiving cavity.

10. The resilient U-base fastener of claim 6 comprising a second rib retention barb connected to the first side, the second rib retention barb bending inwardly into the central rib receiving cavity and toward the insertion end, the second rib retention barb being positioned and designed to retain the rib within the central rib receiving cavity.

11. The resilient U-base fastener of claim 10 wherein the first rib retention barb and the second rib retention barb are positioned adjacent to and separated from the first aperture retention spring arm, and the first rib retention barb is positioned at a different vertical height relative to the insertion end from the second rib retention barb.

12. The resilient U-base fastener of claim 6 comprising:
a third aperture retention spring arm connected to the second side of the body and bending outwardly away from the central rib receiving cavity;
a fourth aperture retention spring arm connected to the second side of the body adjacent the third aperture retention spring arm, the fourth aperture retention spring arm bending outwardly away from the central rib receiving cavity; and
wherein an inner lateral edge of the third aperture retention spring arm and an inner lateral edge of the fourth aperture retention spring arm define a second gap to separate the third aperture retention spring arm from the fourth aperture retention spring arm, and the inner lateral edge of the third aperture retention spring arm has an inner vertical height that is longer than an outer vertical height of an outer lateral side edge of the third aperture retention spring arm.

13. The resilient U-base fastener of claim 12 wherein:
the gap between the first aperture retention spring arm and the second aperture retention spring arm is laterally aligned with the second gap between the third aperture retention spring arm and the fourth aperture retention spring arm, and the gap extends from the first side into the insertion end toward the second gap.

14. A resilient U-base fastener for coupling a first component having a rib to a second component having an aperture therethrough, the resilient U-base faster comprising:
a U-shaped body defining a central rib receiving cavity between a first side and a second side, the first side connected to the second side at an insertion end;
the first side of the body including a first aperture retention spring arm and a second aperture retention spring arm that each bends outwardly away from the central rib receiving cavity, the first and second aperture retention spring arms being positioned and designed to engage a periphery of the aperture to retain the resilient U-base fastener within the aperture;
the first side of the body including a first rib retention barb and a second rib retention barb that each bends inwardly into the central rib receiving cavity and toward the insertion end, the first and second rib retention barbs being positioned and designed to retain the rib within the central rib receiving cavity;
the second side of the body including a third aperture retention spring arm and a fourth aperture retention spring arm that each bends outwardly away from the central rib receiving cavity, the third and fourth aperture retention spring arms being positioned and designed to engage the periphery of the aperture to retain the resilient U-base fastener within the aperture; and
wherein an inner lateral edge of the first aperture retention spring arm and an inner lateral edge of the second aperture retention spring arm define opposite sides of a first gap in the first side that continuously extends from respective free distal ends of the first and second aperture retention spring arms toward the insertion end to separate the first aperture retention spring arm from the second aperture retention spring arm, and wherein an inner lateral edge of the third aperture retention spring arm and an inner lateral edge of the fourth aperture retention spring arm define opposite sides of a second gap that continuously extends from respective free distal ends of the third and fourth aperture retention spring arms toward the insertion end to separate the third aperture retention spring arm from the fourth aperture retention spring arm.

15. The resilient U-base fastener of claim 14 wherein the first aperture retention spring arm bends outwardly and away from the central rib receiving cavity at a first bend and the second aperture retention spring arm bends outwardly and away from the central rib receiving cavity at a second bend, and the insertion end includes a bridging portion between the first and second gaps that is located vertically below the first bend and the second bend.

16. The resilient U-base fastener of claim 14 wherein the insertion end includes a bridging portion between the first and second gaps that has a circumferential length of less than 3 mm.

17. The resilient U-base fastener of claim 14 wherein the first and second gaps meet together such that the first aperture retention spring arm and the third aperture retention spring arm are further separated from the second aperture retention spring arm and the fourth aperture retention spring arm by the first and second gaps throughout the insertion end.

18. The resilient U-base fastener of claim 14 wherein the insertion end includes a tab of material that projects laterally between the first and second gaps that is connected to one lateral edge of the first and second gaps and is disconnected from an opposite lateral edge of the first and second gaps.

19. The resilient U-base fastener of claim 18 wherein the tab touches the opposite lateral edge of the first and second gaps.

20. The resilient U-base fastener of claim 14 wherein:
the first side includes a first barb extension and a second barb extension, the first and second barb extensions extend laterally outwardly from opposite lateral sides of the first side and are bent laterally inwardly to support the first and second rib retention barbs, respectively, in the central rib receiving cavity; and the second side includes a third barb extension and a fourth barb extension, the third and fourth barb extensions extend laterally outwardly from opposite lateral sides of the first side and are bent laterally inwardly to support third and fourth rib retention barbs, respectively, in the central rib receiving cavity, wherein the third and fourth rib retention barbs extend inwardly and toward the insertion end and are positioned and designed to retain the rib within the central rib receiving cavity.

21. The resilient U-base fastener of claim 14 wherein the first and third aperture retention spring arms are positioned at a first vertical height relative to a trailing end of the fastener and designed to engage and retain the periphery of the aperture to retain the periphery of the aperture in the panel having a first thickness related to the first vertical height, and the second and fourth aperture retention shoulder are positioned at a second vertical height relative to a trailing end of the fastener that is different from the first vertical height and is designed to engage and retain the periphery of the aperture in the panel having a second thickness related to the second vertical height.

* * * * *

UNITED STATES PATENT AND TRADEMARK OFFICE
CERTIFICATE OF CORRECTION

PATENT NO. : 10,894,516 B2
APPLICATION NO. : 16/007728
DATED : January 19, 2021
INVENTOR(S) : Steven M. Benedetti et al.

Page 1 of 1

It is certified that error appears in the above-identified patent and that said Letters Patent is hereby corrected as shown below:

In the Claims

Claim 14, Column 19, Line 63, delete "faster" and insert --fastener-- therefor

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*